(12) United States Patent
Krishnamurthy et al.

(10) Patent No.: US 12,326,868 B2
(45) Date of Patent: Jun. 10, 2025

(54) METHODS AND SYSTEMS FOR PROVIDING AN ENHANCED RESPONSE TO A QUERY IN AN IOT ENVIRONMENT

(71) Applicant: Samsung Electronics Co., Ltd., Suwon-si (KR)

(72) Inventors: Vignesh Kumar Krishnamurthy, Bengaluru (IN); Sumit Agarwal, Bengaluru (IN); Prathyusha Maligireddy, Bengaluru (IN); Shruthi Hariharan, Bengaluru (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/298,714

(22) Filed: Apr. 11, 2023

(65) Prior Publication Data

US 2023/0252036 A1 Aug. 10, 2023

Related U.S. Application Data

(63) Continuation of application No. PCT/KR2022/014934, filed on Oct. 5, 2022.

(30) Foreign Application Priority Data

Oct. 6, 2021 (IN) .............................. 202141045517

(51) Int. Cl.
 *G06F 16/00* (2019.01)
 *G06F 16/2457* (2019.01)
 *G06F 16/9535* (2019.01)

(52) U.S. Cl.
 CPC .... *G06F 16/24578* (2019.01); *G06F 16/9535* (2019.01)

(58) Field of Classification Search
 CPC ........... G06F 16/24578; G06F 16/9535; G06F 16/90332; G06F 16/3329; H04L 67/12; H04L 67/306
 See application file for complete search history.

(56) References Cited

U.S. PATENT DOCUMENTS

| | | | |
|---|---|---|---|
| 10,372,767 B2 | 8/2019 | Cohn et al. | |
| 10,706,450 B1 | 7/2020 | Tavernier | |

(Continued)

FOREIGN PATENT DOCUMENTS

| | | | |
|---|---|---|---|
| AU | 2018256336 A1 | 12/2019 | |
| KR | 10-2021-0001082 A | 1/2021 | |

(Continued)

OTHER PUBLICATIONS

Indian Office Action dated Aug. 11, 2023, issued in Indian Application No. 202141045517.

(Continued)

*Primary Examiner* — Debbie M Le
(74) *Attorney, Agent, or Firm* — Jefferson IP Law, LLP

(57) ABSTRACT

Methods and systems for providing an enhanced response to a query in an internet of things (IoT) environment are provided. The method includes receiving a query and generating a response for the query. The method further includes determining at least one intent in relation to at least one portion of the generated response and ranking the at least one intent based on user preferences and a usage history associated with at least one user device present in an IoT environment. The method further includes distinguishing the at least one portion of the generated response with the determined at least one intent based on the ranking of the at least one intent.

16 Claims, 40 Drawing Sheets

(56) References Cited

U.S. PATENT DOCUMENTS

| | | | |
|---|---|---|---|
| 10,819,806 B2* | 10/2020 | Jablonski | G06F 40/284 |
| 10,909,983 B1 | 2/2021 | Peng et al. | |
| 11,153,387 B2* | 10/2021 | Jepperson | H04L 67/565 |
| 11,205,422 B2* | 12/2021 | Kwatra | G10L 25/24 |
| 11,315,162 B2* | 4/2022 | Westlake | G06Q 30/0251 |
| 11,379,487 B2* | 7/2022 | Cheng | G06N 5/04 |
| 11,442,999 B2* | 9/2022 | Mishra | G06F 16/24578 |
| 11,610,585 B2 | 3/2023 | Sindhwani | |
| 11,682,393 B2* | 6/2023 | Jain | G10L 15/22 704/275 |
| 2013/0282682 A1 | 10/2013 | Batraski et al. | |
| 2014/0136536 A1 | 5/2014 | Ramsey et al. | |
| 2019/0318037 A1* | 10/2019 | Mishra | G06F 16/31 |
| 2019/0347358 A1* | 11/2019 | Mishra | G06F 3/167 |
| 2019/0355365 A1 | 11/2019 | Kim et al. | |
| 2019/0370401 A1* | 12/2019 | Grant | H04W 4/70 |
| 2020/0065680 A1* | 2/2020 | Cheng | G06F 16/951 |
| 2020/0107077 A1* | 4/2020 | Einaudi | G06F 16/735 |
| 2020/0334730 A1* | 10/2020 | Westlake | G06N 20/00 |
| 2020/0349940 A1 | 11/2020 | Ko et al. | |
| 2021/0073254 A1* | 3/2021 | Ghafourifar | G06F 16/3334 |
| 2021/0304904 A1* | 9/2021 | Anantharaj | G16Y 40/30 |
| 2022/0004872 A1 | 1/2022 | Raja et al. | |
| 2022/0020358 A1 | 1/2022 | Song et al. | |
| 2022/0318521 A1* | 10/2022 | Ray | G06F 40/232 |
| 2023/0394045 A1* | 12/2023 | Nixon | G06F 16/248 |

FOREIGN PATENT DOCUMENTS

| | | |
|---|---|---|
| KR | 10-2566607 B1 | 8/2023 |
| WO | 2018/195051 A1 | 10/2018 |
| WO | 2020/190103 A1 | 9/2020 |

OTHER PUBLICATIONS

Indian Hearing Notice dated Aug. 23, 2024, issued in Indian Patent Application No. 202141045517.

Extended European Search Report dated Sep. 19, 2024, issued in European Patent Application No. 22878862.6.

* cited by examiner

FIG. 5C

| | Search Information | Set Reminder | Show Pictures | Online Shopping | Search Recipes |
|---|---|---|---|---|---|
| User 1 | 1 | 0 | 0 | 1 | 0 |
| User 2 | 0 | 0 | 0 | 0 | 1 |
| User 3 | 0 | 0 | 0 | 1 | 0 |
| User 4 | 0 | 0 | 1 | 0 | 0 |

FIG. 5D

|        | App A | App B | App C | App D | App E |
|--------|-------|-------|-------|-------|-------|
| User 1 | 1     | 0     | 0     | 1     | 0     |
| User 2 | 0     | 1     | 0     | 0     | 1     |
| User 3 | 0     | 0     | 0     | 1     | 0     |
| User 4 | 1     | 0     | 1     | 0     | 0     |

FIG. 5E

|        | Speaker | Mobile | Television | Family Hub | Buds |
|--------|---------|--------|------------|------------|------|
| User 1 | 1       | 1      | 0          | 1          | 0    |
| User 2 | 1       | 1      | 0          | 0          | 1    |
| User 3 | 0       | 0      | 0          | 1          | 0    |
| User 4 | 1       | 1      | 1          | 0          | 0    |

How do I make white sauce?

Here it is:

In a small saucepan over medium heat, melt butter.
Add flour and stir until the butter and flour are well combined. Pour in milk, stirring constantly as it thickens. Add more milk as required.

Search for a recipe for making butter from milk.

FIG. 16A

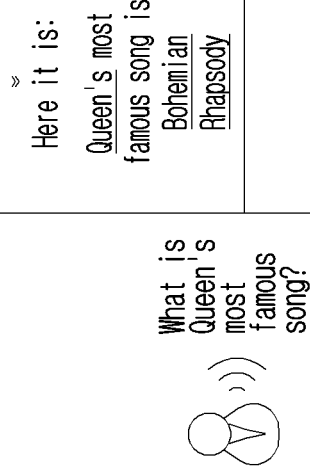

Ranking Table : "Bohemian Rhapsody"

| Intent | Domain | Device | Location | Score |
|---|---|---|---|---|
| PlayMusic | App A | Speaker | Living Room | 0.527 |
| SearchInfo | Internet | Mobile | Living Room | 0.2 |
| ... | ... | ... | ... | ... |
| PlayMusic | App A | Galaxy Buds | Bedroom | 0.298 |

Bohemian Rhapsody

Play this on App A on the speaker

Look up the Movie Bohemian Rhapsody

Ranking Table : "Bohemian Rhapsody"

| Intent | Domain | Device | Location | Score |
|---|---|---|---|---|
| PlayMusic | App A | Galaxy Buds | Bedroom | 0.538 |
| SearchInfo | Internet | Mobile | Bedroom | 0.282 |
| ... | ... | ... | ... | ... |
| PlayMusic | App A | Speaker | Living Room | 0.0057 |

Bohemian Rhapsody

Play this on my Galaxy Buds

Look up the Movie Bohemian Rhapsody

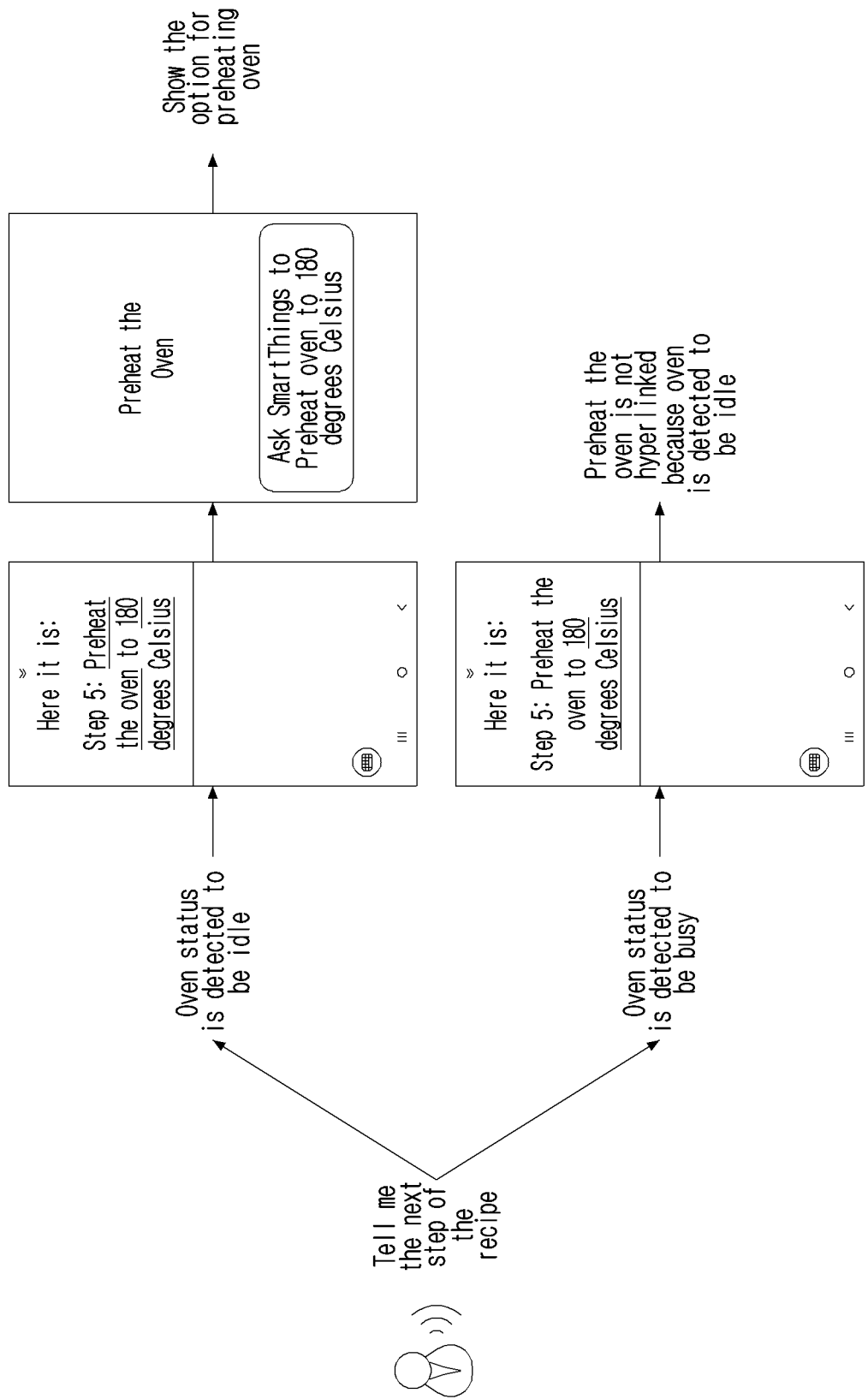

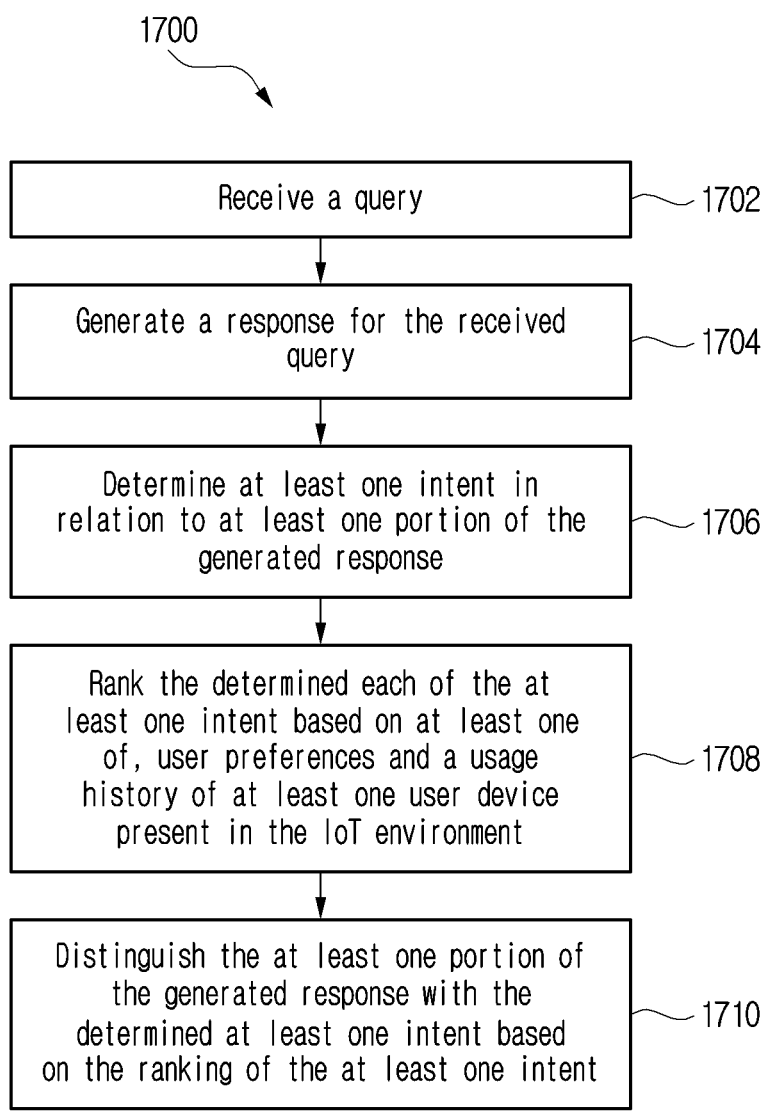

METHODS AND SYSTEMS FOR PROVIDING AN ENHANCED RESPONSE TO A QUERY IN AN IOT ENVIRONMENT

CROSS-REFERENCE TO RELATED APPLICATION(S)

This application is a continuation application, claiming priority under § 365(c), of an International application No. PCT/KR2022/014934, filed on Oct. 5, 2022, which is based on and claims the benefit of an Indian patent application number 202141045517, filed on Oct. 6, 2021, in the Indian Intellectual Property Office, the disclosure of which is incorporated by reference herein in its entirety.

BACKGROUND

1. Field

The disclosure relates to the field of an Internet of Things (IoT) environment. More particularly, the disclosure relates to providing an enhanced response to a query in an IoT environment.

2. Description of the Related Art

In general, a virtual assistant system/digital assistant system provides a dialog interface between a user and an electronic device. The dialog interface allows the user to interact with the electronic device (i.e., to send a query to the virtual assistant system and receive a response from the virtual assistant system in response to the sent query). The user may interact with the electronic device using at least one of a voice assistant, a natural language in text forms, or the like (hereinafter collectively referred as virtual interactions). However, in approaches according to the related art, follow ups/subsequent interactions in the virtual interactions may not be smooth in terms of assistant capabilities. For example, the user may require an additional execution cycle to repeat inputs/queries for additional information related to the response. Thus, the user may lose focus of what the user is doing when switching to a new query response.

Further, some portions in the response may lead to other actions or usage of other devices. However, the user has to query for the other actions manually. In the approaches according to the related art, the user may be provided with features such as, hints, conversation drivers, or the like, which provide information about the actions related to the portions in the response. However, such features are too dependent on the query and a current context of the query. Thus, the user may have limited choices to select depict the actions related to the response, thereby reducing discoverability of the actions that could be associated with the response. In addition, the above-described problems may add up and make usage of the virtual assistant system cumbersome/unappealing for the user as a whole.

FIGS. 1A, 1B, and 1C are example diagrams depicting approaches of providing a response to a query received from a user, wherein the user has to act manually by repeating usage of a virtual assistant input mode, according to the related art.

Referring to FIG. 1A, a user interacts with a dialog interface for a recipe. In such a scenario, the user is provided with the requested recipe, wherein the recipe includes measurement of ingredients in a metric system. However, the user wants the measurement of the ingredients in an imperial system. In order to obtain the measurement of the ingredients in the imperial system, the user has to repeat the interaction with the dialog interface by explicitly mentioning the measurement of the ingredients. The user may be provided with the measurement of the ingredients in the imperial system. However, the user loses a recipe screen (i.e., a screen on which the recipe was provided to the user), while viewing the measurement of the ingredients in the imperial system.

Referring to FIG. 1B, a user interacts with a dialog interface and receives a virtual response. The user finds a date in the received virtual response and wants to book a holiday trip on the found date. However, in order to book the holiday trip, the user has to interact with the dialog interface by explicitly mentioning the date and information for booking the holiday trip. Thus, the user has to act manually when the user expects the dialog interface to follow up on the corresponding date.

Referring to FIG. 1C, a user is checking for weather information in a received virtual response. The user wants to obtain cross domain or cross device options with respect to the received weather information. However, in order to obtain the cross domain or the cross device options, the user has to repeat the interaction with the dialog interface by explicitly mentioning the weather information.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for providing an enhanced response to a query in an Internet of Things (IoT) environment.

Another aspect of the disclosure is to provide methods and systems for determining at least one intent in relation to at least one portion of a response generated for the query, ranking the determined each intent with respect to each portion of the response, and distinguishing the at least one portion of the response with the determined at least one intent based on the ranking of the at least one intent.

Another aspect of the disclosure is to provide methods and systems for performing at least one action based on the distinguished at least one portion of the response.

Additional aspects will be set forth in part in the description which follows and, in part, will be apparent from the description, or may be learned by practice of the presented embodiments.

Technical Solution

In accordance with an aspect of the disclosure, methods and systems for providing a response to a query in an Internet of Things (IoT) environment are provided. The method includes receiving, by an electronic device, the query, generating, by the electronic device, the response for the received query, determining, by the electronic device, at least one intent in relation to at least one portion of the generated response, ranking, by the electronic device, the determined each of the at least one intent based on at least one of user preferences and a usage history of at least one user device present in the IoT environment, and distinguishing, by the electronic device, the at least one portion of the generated response with the determined at least one intent based on the ranking of the at least one intent.

In accordance with another aspect of the disclosure, an electronic device is provided. The electronic device includes a memory and a controller. The controller is configured to receive a query, generate the response for the received query, determine at least one intent in relation to at least one portion of the generated response, rank the determined each of the at least one intent based on at least one of user preferences and a usage history of at least one user device present in the IoT environment, and distinguish the at least one portion of the generated response with the determined at least one intent based on the ranking of the at least one intent.

Other aspects, advantages, and salient features of the disclosure will become apparent to those skilled in the art the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which:

FIGS. 5C, 5D, and 5E depict an intent utility matrix, a domain utility matrix, and a device utility matrix, respectively, according to various embodiments of the disclosure;

FIGS. 16A and 16B are example diagrams depicting use case scenarios of providing actionable information for portions of a response based on a status and a location of user devices associated with a user, according to various embodiments of the disclosure; and FIG. 17 is a flow diagram depicting a method for providing a response to a query, according to an embodiment of the disclosure.

Throughout the drawings, like reference numerals will be understood to refer to like parts, components, and structures.

DETAILED DESCRIPTION

Figure 1A:
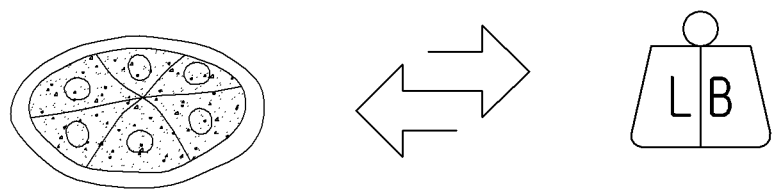
FIGS. 1A, 1B, and 1C are example diagrams depicting approaches of providing a response to a query received from a user, wherein the user has to act manually by repeating usage of a virtual assistant input mode, according to the related art.
Figure 1B:
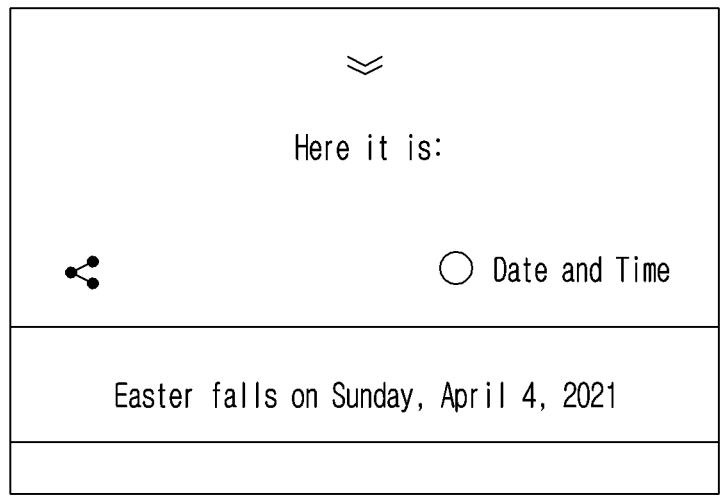
Figure 1C:
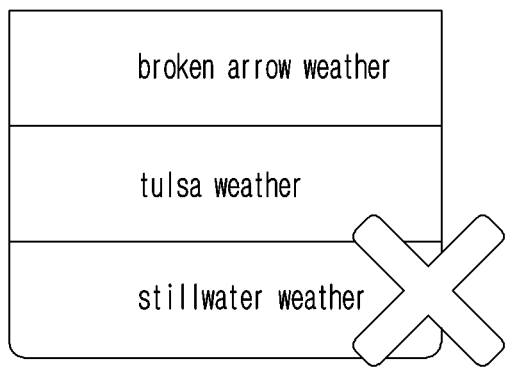

The following description with reference to the accompanying drawings is provided to assist in a comprehensive understanding of various embodiments of the disclosure as defined by the claims and their equivalents. It includes various specific details to assist in that understanding but these are regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for determining one or more intents in relation to each portion of a response generated for a query and ranking the determined one or more intents based on user preferences and usage history of devices present in an Internet of Things (IoT) environment.

Embodiments herein disclose methods and systems for distinguishing each portion of the generated response with the determined one or more intents based on the ranking of each intent.

Embodiments herein disclose methods and systems for enhancing user experience by linking one or more actions across multiple IoT devices to at least one portion of the response generated for the query.

Referring now to the drawings, and more particularly to FIGS. 2 to 4, 5A to 5E, 6, 7, 8A to 8G, 9A, 9B, 9C, 10A, 10B, 10C, 11A, 11B, 11C, 12, 13A to 13C, 14A, 14B, 15A, 15B, 16A, 16B, and 17, where similar reference characters denote corresponding features consistently throughout the figures, there are shown example embodiments.

Figure 2:
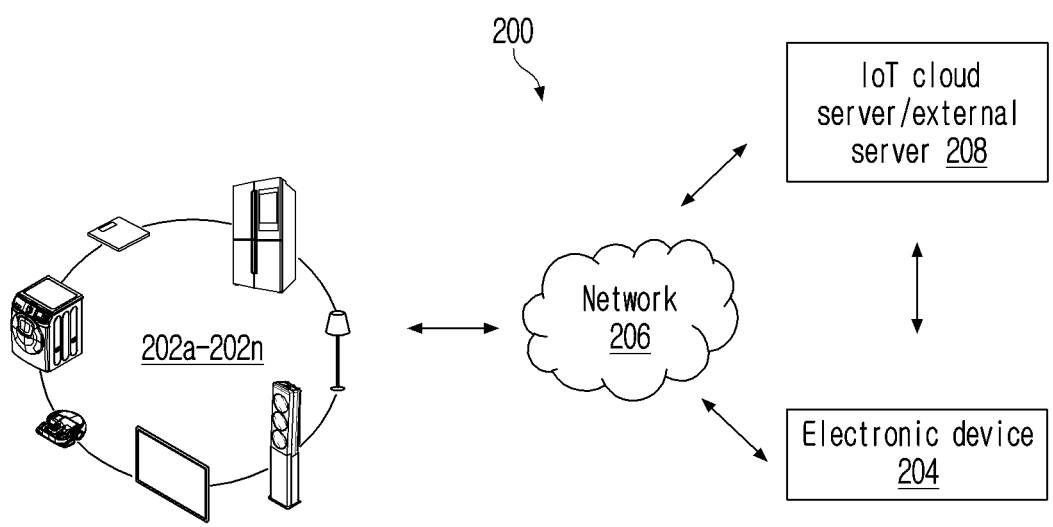
FIG. 2 depicts an Internet of Things (IoT) communication system, according to an embodiment of the disclosure.

FIG. 2 depicts an Internet of Things (IoT) communication system, according to an embodiment of the disclosure. Referring to FIG. 2, an IoT communication system 200 includes a plurality of user devices 202a-202n, and an electronic device 204. The plurality of user devices 202a-202n and the electronic device 204 may be present in an IoT environment. Examples of the IoT environment may be, but are not limited to, a smart home environment, a smart office environment, a smart hospital environment, and so on. In an embodiment, the electronic device 204 may be one of the plurality of user devices 202a-202n. Thus, the electronic device 204 may operate as the user device (e.g., one of the plurality of user devices 202a-202n) or the user device (e.g., one of the plurality of user devices 202a-202n) may operate as the electronic device 204 interchangeably.

The plurality of user devices 202a-202n and the electronic device 204 may be connected with each other. In an example, the plurality of user devices 202a-202n and the electronic device 204 may be connected with each other using a communication network 206. The communication network 206 may include at least one of, but is not limited to, a wired network, a value-added network, a wireless network, a satellite network, or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (wireless fidelity (Wi-Fi)), Bluetooth™, Bluetooth™ low energy, Zigbee, Wi-Fi Direct (WFD), Ultra-wideband (UWB), infrared data association (IrDA), near field communication (NFC), and so on. In another example, the plurality of user devices 202a-202n and the electronic device 204 may be connected with each other directly (e.g., via a direct communication, via an access point, and so on). In another example, the plurality of user devices 202a-202n and the electronic device 204 may be connected with each other via a relay, a hub, and a gateway. It is understood that the plurality of user devices 202a-202n and the electronic device 204 may be connected to each other in any of various manners (including those described above) and may be connected to each other in two or more of various manners (including those described above) at the same time.

The plurality of user devices 202a-202n may be IoT devices, which have been controlled by the electronic device 204 or the user to perform one or more actions. Examples of the plurality of user devices 202a-202n may be, but are not limited to, a smart phone, a mobile phone, a video phone, a computer, a tablet personal computer (PC), a netbook computer, a laptop, a wearable device, a vehicle infotainment system, a workstation, a server, a personal digital assistant (PDA), a smart plug, a portable multimedia player (PMP), a motion picture expert group (MPEG) audio layer III (MP3) player, a speaker, a mobile medical device, a light, a voice assistant device, a camera, a home appliance, one or more sensors, and so on. Examples of the home appliance may be, but are not limited to, a television (TV), a digital video disk (DVD) player, an audio device, a refrigerator, an air conditioner (AC), an air purifier, a chimney, a cooktop, a vacuum cleaner, an oven, microwave, a washing machine, a dryer, a set-top box, a home automation control panel, a security control panel, a game console, an electronic key, a camcorder, an electronic picture frame, a coffee maker, an oven, a rice cooker, a pressure cooker, and so on. Examples of the sensors may be, but are not limited to, a temperature sensor, a humidity sensor, an infrared sensor, a gyroscope sensor, an atmospheric sensor, a proximity sensor, red-green-blue (RGB) sensor (a luminance sensor), a photosensor, a thermostat, an ultraviolet (UV) light sensor, a dust sensor, a fire detection sensor, a carbon dioxide (CO2) sensor, a smoke sensor, a window contact sensor, a water sensor, or any other equivalent sensor. A function of each sensor may be intuitively inferred by one of ordinary skill in the art based on its name, and thus, its detailed description is omitted. Examples of the actions may be, but are not limited to, playing media (audio, video, or the like), capturing the media, purifying the air, performing cooling, or heating of a defined area, controlling lights, sensing various environmental factors (e.g., temperature, smoke, humidity, or the like), and so on.

The plurality of user devices 202a-202n may register with the electronic device 204 by communicating device information, capabilities, and location information to the electronic device 106, once being deployed in the IoT environment. Alternatively, the user may register the plurality of user devices 202a-202n with the electronic device 106. The device information may include information such as, but are not limited to, an identification value (e.g., device ID information), a device type, and so on, of each of the plurality of user devices 202a-202n. In an example herein, the identification value/device ID information may include information such as, but are not limited to, a Media Access Control (MAC) identifier (MAC ID), a serial number, a unique device ID, and so on. Examples of the capabilities of the user devices 202a-202n may be, but are not limited to, an audio, a video, a display, an energy limit, data sensing capability, and so on. The location information includes information about a location of each of the plurality of user devices 202a-202n.

The electronic device 204 referred herein may be a device with which the user may be interacted. Examples of the electronic device 204 may be, but are not limited to, a smart phone, a mobile phone, a video phone, a computer, a tablet personal computer (PC), a netbook computer, a laptop, a wearable device, a personal digital assistant (PDA), a workstation, a server, an IoT device, or any other user device (e.g., one of the plurality of user devices 202a-202n) with which the user may interact.

In an example, the electronic device 204 stores one or more applications. Examples of the applications may be, but are not limited to, a video streaming application, an audio application, a calendar application, a weather information related application, e-commerce applications, a device control-based application (to control one or more of the plurality of user devices 202a-202n), and so on.

In another example, the electronic device 204 also obtains, stores, and maintains the device information, the capabilities, the location information, or the like of each user device (e.g., the plurality of user devices 202a-202n) present in the IoT environment for controlling the one or more actions of one or more of the plurality of user devices 202a-202n. The electronic device 204 also obtains, determines, or generates a control command for controlling each of the plurality of user devices 202a-202n, by utilizing the device information, the capabilities, the location information, or the like of each user device (e.g., the plurality of user devices 202a-202n). The electronic device 204 may transmit the control command to any of the user devices 202a-202n to perform the actions based on the stored capabilities of the respective user devices 202a-202n. The electronic device 204 may receive a result of performing the actions according to the control command from the user devices 202a-202n.

In an embodiment, the electronic device 204 may be configured to provide an enhanced response(s) to a query (ies), which suggests the one or more actions to perform. The electronic device 204 may perform the one or more actions. Alternatively, the electronic device 204 may allow one or more of the plurality of user devices 202a-202n to perform the one or more actions.

For providing the enhanced response, the electronic device 204 receives the query. In an example, the electronic device 204 may receive the query from the user. In another example, the electronic device 204 may receive the query from the one or more applications. The electronic device 204 may receive the query from the user through an input virtual interface. The input virtual interface may include one of, but is not limited to, a user interface (UI) with a keyboard, an interface with physical buttons, a voice interface/voice assistant module/microphone, a media interface, a camera/sensor (for capturing movements of eyes of the user and gestures performed by the user), and so on. The received query may be in a form of at least one of a natural language (NL) text form, a voice input, a media (e.g., an image, a video, or the like), and so on. In addition, the query may be in any of a language.

In an example, the query may be for any aspects of the electronic device 204 for which the user may require assistance. Examples of the aspects of the electronic device 204 may be, but are not limited to, features, elements/components, processes, or the like, associated with the electronic device 204. In another example, the query may be for services provided by the one or more applications in the electronic device 204. In another example, the query may be for information related to one or more of the plurality of user devices 202a-202n present in the IoT environment. The information related to one or more of the plurality of user devices 202a-202n may include at least one of, but is not limited to, the device information, the capabilities, and the current actions being performed by the one or more of the plurality of user devices 202a-202n, the location, and so on. In another example, the query may be for information related to appliances/items, services, events, articles, and so on. In another example, the query may be related to search inputs provided by the user on a website/search engine/database. In another example, the query may include eye-gaze inputs (movements of the eyes of the user while consuming media, text, or the like), gesture inputs (gestures performed by the user while media, text, or the like). It is understood that the query may be for any information/assistance (including those described above).

Embodiments herein use the terms such as "query," "question," "command," "user query/command," "search input," "input," and so on, interchangeably throughout the document.

On receiving the query, the electronic device 204 generates the response for the query. In an example, the response may be in a form of natural language utterance (NLU), sentences/text forms in a natural language, media, and so on. Examples of the media may be, but are not limited to, audio, video, images, graphics interchange formats (GIFs), and so on. In another example, the response may be an image/picture of a person gazed by the user, while viewing picture/pictures in a gallery applications, and so on. The response may be in any language. In an embodiment, the electronic device 204 generates the response in a format standardized/provided by a virtual assistant 400 through a software development kit (SDK). Generation of the response may vary depending on a type of the virtual assistant 400 performable in the electronic device 204. In an example, the response may be generated by dynamically filling the response in developers frame layouts with placeholders. In another example, the response may be automatically formatted to visual elements like cards, based on a nature of the response without requiring any user/developer input.

Once the response has been generated, the electronic device 204 determines one or more intents in relation to the response. For determining the one or more intents, the electronic device 204 analyzes the response and identifies one or more portions of the response. The one or more portions of the response may be one or more phrases of the response. In an example, the one or more portions may depict at least one of named entities (e.g., songs, movies, person/contact name, or the like), an event (e.g., a holiday event, a birthday event, a sports event, a calendar event, or the like), a date expression, a recipe, a proverb, an image/picture of a particular contact, a voice of a particular thing (e.g., a human, an animal, an item/user device, or the like), the one or more actions associated with the user devices 202a-202n, and so on. Embodiments herein use the terms "portions," "phrases," "words," "text," "content," and so on, interchangeably through the document.

The electronic device 204 determines the one or more intents for each of the one or more portions of the response. The intent may be a set of actions associated to a single label/portion to fulfill end user request for the received query. The set of actions may change over time but are always be associated with the intent. In an embodiment, the electronic device 204 determines the one or more intents for the one or more portions of the response based on factors such as, but are not limited to, information/context derived from the query, a relationship between the query and the response, contextual inputs, preferences of the user (hereinafter referred as user preferences), a status of the user devices 202a-202n, a location of the user devices 202a-202n, usage history of the one or more of the plurality of user devices 202a-202n, and so on.

In an example, the context derived from the query depicts at least one of the named entity, the event, the date expression, the recipe, the proverb, the one or more actions, and so on.

In an example, the contextual inputs include at least one of, but is not limited to, partial phrases, recognizable named entities such as songs, movies, recipes or the like, a current application executing on the electronic device 204, the one or more actions being performed by the electronic device 204 at a current instance of time, the one or more actions being performed by the one or more of the plurality of user devices 202a-202n at a current instance of time, and so on.

The user preference may be a strong indicator of what intent (and consequently set of actions) the user want the electronic device 204 to execute. In an example, the user preferences may indicate a user interest towards a specific user device/or a group of user devices 202a-202n. If the electronic device 204 does not maintain any user preferences (i.e., if user has not set any preferences or has not indicated the strong preferences), the electronic device 204 may derive/source the user preferences from the usage history.

In an example, the usage history of the one or more of the plurality of user devices 202a-202n may include at least one of, but is not limited to, individual usage history of metric data, global usage history of the metric data/crowd sourced data/global usage data, and so on. The metric data may include at least one of, but is not limited to, a location, status, and so on of the one or more of the plurality of user devices 202a-202n. The status of the one or more of the plurality of user devices 202a-202n may indicate at least one of, but is not limited to, a power ON/OFF state of the one or more of the plurality of user devices 202a-202n, the actions performed by the one or more of the plurality of user devices 202a-202n, an action cycle associated with the one or more of the plurality of user devices 202a-202n, and so on. Examples of the action cycle associated with the one or more of the plurality of user devices 202a-202n may be, but are not limited to, a washing cycle for a washing machine, a cooling cycle of AC/fridge, a heating cycle of an oven, and so on. The individual usage history of metric data may depict the metric data maintained for the user, who has been associated with the one or more of the plurality of user devices 202a-202n. The global usage history of metric data depicts a collection of the individual usage history of the metric data maintained for a plurality of users, who have been associated with the one or more similar user devices 202a-202n. The electronic device 204 receives the global usage history of the metric data from an IoT cloud server or an external server/crowd server 208. The IoT cloud server or external server/crowd server 208 obtains, stores, and maintains the collection of the individual usage history of the metric data for the plurality of users, who have been associated with the one or more similar user devices 202a-202n.

The electronic device 204 ranks each intent of the one or more intents determined for the one or more portions of the response. For ranking each intent, the electronic device 204 identifies one or more domains and one or more action devices for each of the one or more intents. The electronic device 204 determines the one or more domains and the one or more action devices for each intent by analyzing at least one of, but is not limited to, the user preferences, the status and location of the user devices 202a-202n, the usage history of the one or more of the plurality of user devices 202a-202n, and so on. The one or more domains and the one or more action devices identified for each intent may be capable of executing the respective intent. The domain may depict a collection of intents with a commonality. For example, the intents such as, creating a schedule, reading schedules for a particular day, deleting schedules, or the like, may belong to a "calendar" domain. The one or more action devices may be the user devices (e.g., the plurality of user devices 202a-202n), which have been capable of executing the one or more actions associated with each intent.

On determining the one or more domains and the one or more action devices, the electronic device 204 forms mappings of intents for each portion of the response. Each mapping of intents includes a mapping of the intent with the associated domains and action devices. The electronic device 204 ranks each mapping of intents and provides valid domains and action devices for each intent. The valid domains and action devices may be the domains and the action devices for which the user has permissions to access. The electronic device 204 ranks each mapping of intents corresponding to each portion of the response and provides the valid domains and action devices for each intent by processing/analyzing at least one of the one or more domains and the one or more action devices identified for each intent, the user preferences, the usage history of the one or more of the plurality of user devices 202a-202n, and so on. In an embodiment, the electronic device 204 uses a learning method to process at least one of, but is not limited to, the one or more domains and the one or more action devices identified for each intent, the user preferences, and so on. In an example, the learning method includes a non-machine learning method. The non-machine learning method involves using at least one of a statistical model, a manual selection (e.g., based on decisions of a product manager/human domain expert), a correlation based on usage parameters (such as frequency of use, or the like), and so on, to process at least one of, but is not limited to, the one or more domains and the one or more action devices identified for each intent, the user preferences, and so on, for ranking each intent.

In another example, the learning method includes a machine learning method. The machine learning method involves using a machine learning module/model to process at least one of, but is not limited to, the one or more domains and the one or more action devices identified for each intent, the user preferences, the usage history of the one or more of the plurality of user devices 202a-202n, and so on, for ranking each intent. Also, the electronic device 204 may provide the one or more domains and the one or more action devices identified for each intent, the user preferences, the usage history of the one or more of the plurality of user devices 202a-202n, or any parameter of a similar nature as inputs to the machine learning module to rank the intent and provide the valid domains and action devices for the intent.

Examples of the machine learning module may be, but are not limited to, a convolutional neural network (CNN), a neural; network module, a deep neural network (DNN), a neural collaborative filtering (NCF) model, a recurrent neural network (RNN), a restricted Boltzmann machine (RBM), a deep belief network (DBN), a bidirectional recurrent deep neural network (BRDNN), generative adversarial networks (GAN), a regression based neural network, a deep reinforcement model (e.g., with rectified linear activation unit (ReLU) activation), a deep Q-network, and so on. The machine learning module may include a plurality of nodes, which may be arranged in the layers. Examples of the layers may be, but are not limited to, a convolutional layer, an activation layer, an average pool layer, a max pool layer, a concatenated layer, a dropout layer, a fully connected layer, a SoftMax layer, and so on. A topology of the layers of the machine learning module may vary based on the type of the machine learning module. In an example, the machine learning module may include an input layer, an output layer, and a hidden layer. The input layer receives a layer input (e.g., the one or more domains, the one or more action devices, the user preferences, or the like) and forwards the received layer input to the hidden layer. The hidden layer transforms the layer input received from the input layer into a representation, which can be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers. Ranking of the intent using the machine learning module is described in detail in conjunction with FIGS. 5A, and 5B.

In an example, as the user preferences may be the strong indicator of what domains and/or action device the user may use, the electronic device 204 prioritizes the ranking of the intents associated with the domains and/or the action devices specified in the user preferences. In another example, the identified portions of the response or the identified portions of the response in combination with the factors (such as the query, the response, the context, the status of devices, the user preferences, or the like) may affect the ranking of the intents.

In another example, if the electronic device 204 does not maintain the user preferences, the electronic device 204 use the usage history to rank the intents associated with each portion of the response.

In another example, if the status or location of the action devices may dictate the presence of absence of the intents/ranking of the intents. For example, if the action device is far away or switched off, the intents related to the action device may be least prioritized/ranked. Also, such intents may not be provided to the user.

On ranking the intent, the electronic device 204 distinguishes the one or more portions of the response. The response with the distinguished one or more portions may be referred as the enhanced response. For distinguishing the one or more portions of the response, the electronic device 204 generates actionable information/options for each portion. The actionable information depicts the one or more actions, which may be performed with respect to the received query. The actionable information includes at least one of, but is not limited to, an NLU, sentences/text forms in a natural language, media, emotions, icons, buttons, and so on. Examples of the media may be, but are not limited to, audio, video, images, GIFs, and so on. Examples of the actions may be, but are not limited to, playing media, saving calendar events, displaying images for contacts, providing food recipes, setting reminders, translating media from one language to another language and playing the translated media, and so on. The electronic device 204 generates the actionable information for the portion of the response based on at least one of, but is not limited to, the ranking of each intent associated with the portion, the one or more domains and the one or more actions identified for each intent associated with the portion, the user preferences, the usage history of the one or more of the plurality of user devices 202a-202n, the current status and location of the user devices 202a-202n, and so on.

The actionable information indicates information required by the electronic device 204/virtual assistant 400 to execute the intent and the action that can be performed by the user corresponding to the intent/portion of the response. The information required by the electronic device 204/virtual assistant 400 to execute the intent may not be shown to the user (i.e., abstracted for the user), as such information is unnecessary to the user. The action that can be performed by the user corresponding to the intent/portion of the response may be indicated in a user-friendly representation (e.g., in a natural language sentence).

In an embodiment, the electronic device 204 may structure the user-friendly representation/natural language sentence based on information used to determine and rank the intents mapped with the domains and the action devices.

Consider an example scenario, wherein the user is associated with both a TV and a tablet, but the TV is currently in use (i.e., occupied). In such a scenario, the electronic device 204 generates the actionable information like "play this video on tablet." The electronic device 204 does generate the actionable information like "play this video on TV," since the TV is currently in use.

Consider an example scenario, wherein the user always uses a "domain A" for news reading purposes. In such a scenario, the electronic device 204 determines the domain A as the user preference and generates an icon of "domain A" as the actionable information to show the user that the "domain A" may be used for news reading.

The electronic device 204 also categorizes the actionable information based on at least one of, but is not limited to, the one or more actions associated with the actionable information, a category of the one or more applications that may perform the one or more actions related to the actionable information, and so on. The actionable information generated for the portion of the response may vary dynamically based on at least one of the query, the one or more intents associated with the portion and the associated ranking, the one or more domains and action devices associated with the one or more intents, the user preferences, the current status and location of the user devices 202a-202n, and so on.

In an embodiment, the electronic device 204 may generate the one or more intents related to the portion as the actionable information for the corresponding portion. In another embodiment, the electronic device 204 may generate a combination of the intents related to the portion as the actionable information for the corresponding portion. The electronic device 204 generates the one or more intents or the combination of the one or more intents as the actionable information based on a similarity measurement and quantifying correlation. The similarity measurement and quantifying correlation may be used to understand how related the user devices 202a-202n are and to generate better actionable information/options. For example, if "Easter" and "Sunday, Apr. 4, 2021," are in the same response, the electronic device 204 generates one of the actionable information/response by identifying the correlation of "Easter date is Sunday, Apr. 4, 2021," with "Search for Local Church Services on Easter, Sunday, Apr. 4, 2021," which may be relevant only for Easter and Sunday, Apr. 4, 2021.

In an embodiment, the electronic device 204 may also prioritize the actionable information generated for each portion. The electronic device 204 computes slot values for each actionable information and prioritizes/ranks the actionable information based on the slot values. To generate/frame the actionable information, the electronic device 204 may take the slot value from one of the other portions identified in the response. In an example, a natural language sentence framed from the actionable information/option may have slot values filled from the response (augmented response or otherwise the response itself).

Consider an example scenario, wherein a reminder/calendar event may have a title like "meeting," "reminder," or the like. In such a scenario, the electronic device 204 may set the title for the reminder/calendar event as "Easter meeting," "Easter reminder," if one of the distinguished portions in the response includes a word "Easter."

Embodiments herein use the terms "actionable information," "options," "actions," "action suggestions," "action recommendations," "virtual objects/options," "virtual information," "auxiliary response," "additional assistance," and so on, interchangeably to refer to information depicting the one or more actions related with the respective portion/intent of the response.

On generating and/or categorizing and/or prioritizing the actionable information, the electronic device 204 links the generated actionable information with the respective one or more portions of the response. The electronic device 204 distinguishes the one or more portions of the response, upon linking the actionable information with each of the one or more portions of the response. In an embodiment, the electronic device 204 distinguishes the one or more portions of the response linked with the actionable information by hyperlinking the one or more portions of the response. In another embodiment, the electronic device 204 distinguishes the one or more portions of the response linked with the actionable information by creating one or more objects for the one or more portions of the response. Examples of the one or more objects may be, but are not limited to, audio, an image, an icon, a label, a graphical user interface (GUI) object, an emotion, a button, and so on. In another embodiment, the electronic device 204 distinguishes the one or more portions of the response linked with the actionable information by providing the one or more portions of the response linked with the actionable information in different text styles, art, or the like.

The electronic device 204 provides the distinguished one or more portions of the response (i.e., the enhanced response) to the user through an output virtual interface, based on characteristics of the electronic device 204, features of the electronic device 204, and so on. Examples of the output virtual interface may be, but are not limited to, a sound outputter/voice assistant module, a display, a vibration motor, a user interface (UI) module, a light emitting device, and so on. The distinguished portions of the response indicate that the user can interact with such portions. Embodiments herein use the terms such as "enhanced response," "response with distinguished/marked portions," "virtually inter-actable response," and so on, interchangeably to refer to the response including the one or more portions/contents with which the user can interact for follow ups/actionable information.

The electronic device 204 also provides the actionable information to the user, when the user interacts with the respective distinguished portion of the response. Interacting by the user with the portion of the response involves selecting the portion(s) by performing gestures, selecting the portion(s) with a voice utterance, selecting the portion(s) with movements of the eye, and so on. Examples of the gestures may be, but are not limited to, a tap gesture, a hover gesture, a swipe gesture, a gesture performed using a keypad/keyboard, and so on.

The electronic device 204 also performs the one or more actions associated with the actionable information, which has been linked with the one or more portions of the response. Alternatively, the electronic device 204 allows the one or more action devices/user devices 202a-202n to perform the one or more actions. In an example, the electronic device 204 may perform the one or more actions automatically, on distinguishing the one or more portions of the response. In another example, the electronic device 204 may perform the one or more actions, on selecting the corresponding actionable information by the user.

FIG. 2 shows various blocks of an IoT communication system, but it is to be understood that other embodiments are not limited thereon. In other embodiments, the IoT communication system 200 may include less or more number of blocks. Further, the labels or names of the blocks are used only for illustrative purpose and does not limit the scope of the embodiments herein. One or more blocks can be combined together to perform same or substantially similar function in the IoT communication system 200.

Figure 3:
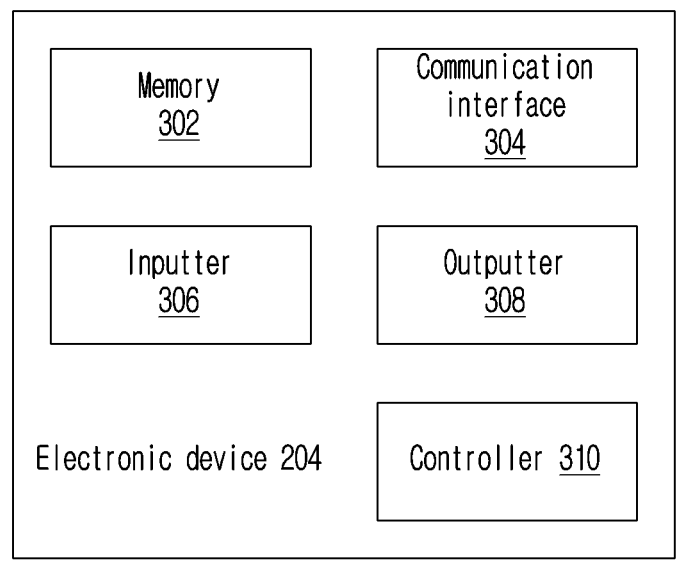
FIG. 3 is a block diagram depicting various components of an electronic device for providing an enhanced response to a query and performing one or more actions based on the enhanced response, according to an embodiment of the disclosure.

FIG. 3 is a block diagram depicting various components of the electronic device for providing the enhanced response to the query and performing the one or more actions based on the enhanced response, according to an embodiment of the disclosure.

Referring to FIG. 3, an electronic device 204 includes a memory 302, a communication interface 304, an inputter 306, an outputter 308, and a controller/processor 310.

The memory 302 may store at least one of, but is not limited to, the device information, the capabilities, and the location of the plurality of user devices 202a-202n present in the IoT environment, the user preferences, the usage history of the one or more of the plurality of user devices 202a-202n, the one or more intents, the one or more domains and the one or more action devices determined for each intent, the actionable information linked with the one or more portions of the response, the distinguished one or more portions of the response (i.e., the enhanced response), and so on. The memory 302 may also store the virtual assistant/enhanced response generator 400, which may be executed by the controller 310 to provide the enhanced response to the user. The memory 302 may also store the machine learning module, which may be executed by the controller 310 to rank each intent. The memory 302 referred herein may include at least one type of storage medium, from among a flash memory type storage medium, a hard disk type storage medium, a multi-media card micro type storage medium, a card type memory (e.g., a secure digital (SD) or an extreme digital (XD) memory), random-access memory (RAM), static RAM (SRAM), read-only memory (ROM), electrically erasable programmable ROM (EEPROM), programmable ROM (PROM), a magnetic memory, a magnetic disk, or an optical disk.

The communication interface 304 may include one or more components which allows the electronic device 204 to communicate with another device (e.g., another electronic device, the plurality of user devices 202a-202n, the IoT cloud server, the external server/crowd server, and so on) using communication methods that have been supported by the communication network 206. The communication interface 304 may include the components such as, a wired communicator, a short-range communicator, a mobile/wireless communicator, and a broadcasting receiver.

The wired communicator may allow the electronic device 204 to communicate with the other devices using the communication methods such as, but are not limited to, wired LAN, the Ethernet, and so on. The short-range communicator may allow the electronic device 204 to communicate with the other devices using the communication methods such as, but are not limited to, Bluetooth™ low energy (BLE), near field communicator (NFC), wireless local area network (WLAN) (or Wi-fi), Zigbee, infrared data association (IrDA), Wi-Fi direct (WFD), UWB communication, Ant+ (interoperable wireless transfer capability) communication, shared wireless access protocol (SWAP), wireless broadband internet (Wibro), wireless gigabit alliance (WiGiG), and so on. The mobile communicator may transceiver wireless signals with at least one of a base station, an external terminal, or a server on a mobile communication network/cellular network. In an example, the wireless signal may include a speech call signal, a video telephone call signal, or various types of data, according to transceiving of text/multimedia messages. The broadcasting receiver may receive a broadcasting signal and/or broadcasting-related information from the outside through broadcasting channels. The broadcasting channels may include satellite channels and ground wave channels. In an embodiment, the electronic device 204 may or may not include the broadcasting receiver.

The inputter 306 may be configured to receive interactive inputs from the user such as, but are not limited to, the queries, selection inputs depicting the one or more portions of the enhanced response or the one or more objects created for the one or more portions, which have been interacted by the user, and so on. The inputter 306 may include the input virtual interface for receiving the interactive inputs from the user. Examples of the input virtual interface may be, but are not limited to, a UI module with a keyboard, a display, a sound inputter/voice assistant module, a microphone, physical buttons, a camera/sensor for capturing the eye gaze inputs and the gesture inputs, and so on.

The outputter 308 may be configured to receive the enhanced response for the query from the controller 310 and provide the received enhanced response to the user for the received query. The outputter 308 may include the output virtual interface to provide the enhanced response to the user. Examples of the output virtual interface may be, but are not limited to, a sound outputter/voice assistant module, a display, a vibration motor, a UI module, a light emitting device, and so on, to provide the enhanced response to the user. The UI module may provide a specialized UI or GUI, or the like, synchronized to the electronic device 204, according to the applications. The enhanced response may be provided in a form of, an audio, a video, an emotion, an image, a button, graphics, text, icons, symbols, vibration signals, and so on.

The controller 310 may include one or a plurality of processors. The one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The controller 310 may be configured to provide the enhanced response for the received query and perform the one or more actions on the electronic device 204 or the one or more of the plurality of user devices 202a-202n based on the enhanced response.

The controller 310 receives the query and generates the response for the query. On generating the response for the query, the controller 310 identifies the one or more portions of the response by analyzing the response. The controller 310 determines the one or more intents in relation to the one or more portions of the response based on at least one of, but is not limited to, the information/context derived from the query, the relationship between the query and the response, the contextual inputs, the user preferences, and the usage history of the one or more of the plurality of user devices 202a-202n, and so on. The controller 310 further ranks each of the determined one or more intents and the associated domains and action devices with respect to each portion. For ranking the intent, the controller 310 determines the one or more domains and the one or more action devices that are capable of executing the respective intent. The controller 310 determines the one or more domains and the one or more action devices by analyzing at least one of, but is not limited to, the user preferences, the usage history of the one or more of the plurality of user devices 202a-202n, and so on. The controller 310 forms the mapping of the intents for each portion of the response. Each mapping of intents includes the mapping of the intent with the associated domains and action devices. The controller 310 ranks each mapping of intents corresponding to each portion by processing at least one of, but is not limited to, the one or more domains and the one or more action devices determined for the intent, the user preferences, the usage history of the one or more of the plurality of user devices 202a-202n, and so on, using the learning method.

Once each of the one or more intents have been ranked, the controller 310 generates the actionable information for each portion of the response by analyzing at least one of, but is not limited to, the ranking of each intent, the one or more domains and the one or more action devices associated with the intent, the user preferences, and the usage history of the one or more of the plurality of user devices 202a-202n, and so on. The actionable information depicts the one or more actions that may be performed in relation to the one or more portions of the response. The controller 310 links the actionable information with the respective one or more portions of the response. The controller 310 distinguishes the one or more portions of the response that have been linked with the actionable information. The controller 310 provides the distinguished one or more portions of the response that have been linked with the actionable information (i.e., the enhanced response) to the user through the outputter 308.

The controller 310 may also perform the one or more actions, which have been depicted by the actionable information linked with each portion of the response. In an example, the controller 310 may automatically perform the one or more actions, on distinguishing the one or more portions of the response. In another example, the controller 310 may perform the one or more actions corresponding to the one or more portions of the response that have been selected by the user. In an example, the controller 310 may perform the one or more actions on the electronic device 204. In another example, the controller 310 may perform the one or more actions on the one or more user devices/action devices 202a-202n.

Figure 4:
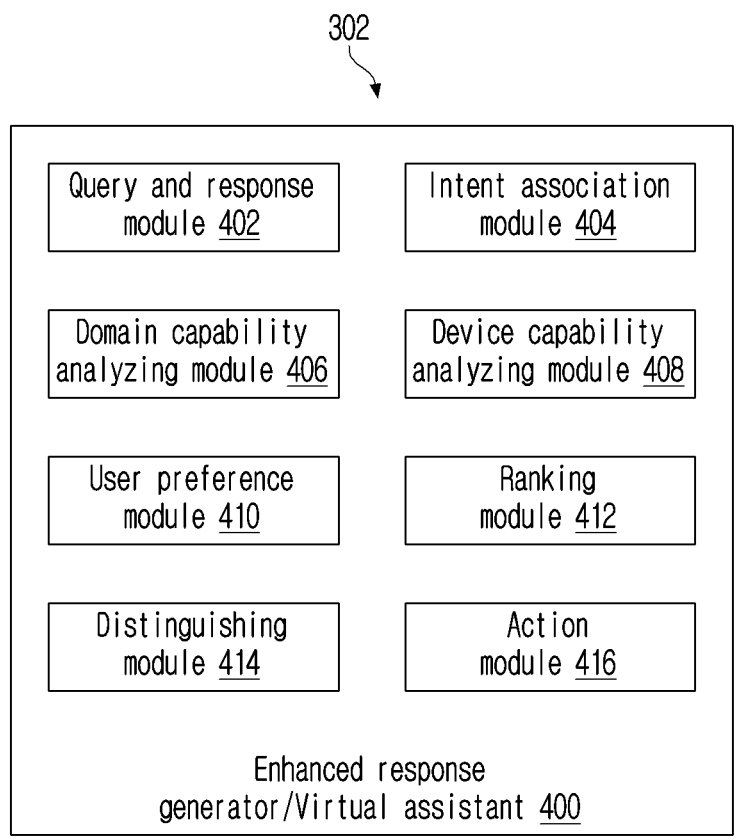
FIG. 4 depicts an enhanced response generator/virtual assistant performing in an electronic device, according to an embodiment of the disclosure.

FIG. 4 depicts an enhanced response generator/virtual assistant performable in the electronic device, according to an embodiment of the disclosure. The controller 310 of the electronic device 204 may execute an enhanced response generator/virtual assistant 400 to provide the enhanced response for the received query and perform the one or more actions on the electronic device 204 or the one or more of the plurality of user devices 202a-202n based on the enhanced response.

Referring to FIG. 4, an enhanced response generator/virtual assistant 400 includes a query and response module 402, an intent association module 404, a domain capability analyzing module 406, a device capability analyzing module 408, a user preference module 410, a ranking module 412, a distinguishing module 414, and an action module 416.

The query and response module 402 may be configured to receive the query from the user through the input virtual interface and generate the response for the received query.

The query and response module 402 provides the received query and the generated response to the intent associated module 404, the ranking module 412, and the distinguishing module 414.

The intent association module 404 may be configured to determine the one or more intents for the response. The intent association module 404 identifies the one or more portions of the response and determines the one or more intents for each of the one or more portions of the response. The intent association module 404 determines the one or more intents by analyzing at least one of, but is not limited to, the information derived from the query, the relationship between the query and the response, the contextual inputs, the user preferences, and the usage history of the one or more of the plurality of user devices 202a-202n, and so on. The intent association module 404 provides the one or more intents determined in relation to the one or more portions of the response to the domain capability analyzing module 406, the device capability analyzing module 408, the ranking module 412, and the distinguishing module 414.

The domain capability analyzing module 406 may be configured to determine the one or more domains that are capable of executing the one or more intents determined in relation to the one or more portions of the response. The domain capability analyzing module 406 determines the one or more domains for the one or more intents by analyzing at least one of, but is not limited to, the user preferences, the usage history, and so on. The domain capability analyzing module 406 provides information about the one or more domains determined for the one or more intents to the ranking module 412, and the distinguishing module 414.

The device capability analyzing module 408 may be configured to determine the one or more action devices from the plurality of user devices 202a-202n, which are capable of executing the one or more intents determined in relation to the one or more portions of the response. The device capability analyzing module 408 determines the one or more domains for the one or more intents by analyzing at least one of, but is not limited to, the user preferences, the usage history, and so on. The device capability analyzing module 408 provides information about the one or more action devices determined for the one or more intents to the ranking module 412, and the distinguishing module 414.

The user preference module 410 may be configured to collect the user preferences, the usage history of the one or more of the plurality of user devices 202a-202n, the current status and location of the one or more of the plurality of user devices 202a-202n, and so on. The user preferences may depict the one or more domains and/or the one or more action devices for which the user is interested. The usage history includes the individual usage history of the metric data and the global usage history of the metric data. In an example, the user preference module 410 collects the user preferences and the individual usage history of the metric data by monitoring the interactions of the user with the electronic device 204, over a time. In another example, the user preference module 410 collects the user preferences and the individual usage history of the metric data from preference inputs provided by the user manually. In an example, the user preference module 410 collects the global usage history of the metric data from the IoT cloud server or the external server/crowd server 208, or the like.

In an embodiment, the user preference module 410 may use the collected user preferences, the usage history, and the current status and location of the user devices 202a-202n to determine the one or more domains and the one or more action devices from the plurality of user devices 202a-202n for each of the one or more intents, when the user has provided the user preferences for the specific domains or the action devices. In another embodiment, the user preference module 410 may use the collected user preferences and the usage history to determine the one or more domains and the one or more action devices for each of the one or more intents, when enough information related to the domains and/or the user devices 202a-202n have not been maintained in the memory 302. The user preference module 410 provides information about the one or more domains and the one or more action devices determined for the one or more intents to the ranking module 412, and the distinguishing module 414.

The ranking module 412 may be configured to rank each of the one or more intents determined in relation to the one or more portions of the response. The ranking module 412 may also be configured to perform the validation to check if the user has permissions to access the one or more domains and the one or more action devices determined for the one or more intents. Based on the validation, the ranking module 412 provides information about the valid number of domains and/or the valid number of action devices associated with the one or more intents to the user. The valid number of domains/action devices may be the domains/action devices for which the user has permissions to access. The ranking module 412 analyzes at least one of the one or more domains and the one or more action devices determined for the intent, the user preferences, and so on using the learning method to rank the one or more intents and provide information about the valid number of domains and/or the action devices for the one or more intents.

In an embodiment, the learning method includes the non-machine learning method.

In another embodiment, the learning method includes the machine learning method. The machine learning method involves using the machine learning module/model to process/analyze at least one of the one or more domains and the one or more action devices determined for the intent, the user preferences, and so on, and to rank the one or more intents and provide information about the valid number of domains and/or the action devices for the one or more intents. The machine learning module may include a plurality of layers. Each layer has a plurality of weight values and performs a layer operation through calculation of a previous layer and an operation of a plurality of weights/coefficients. Examples of the machine learning module may be, but are not limited to, a neural network, a CNN, a DNN, an RNN, an RBM, a DBN, a BRDNN, GAN, a regression based neural network, a deep reinforcement model (with ReLU activation), a deep Q-network, an NCF model, and so on. The machine learning module may include a plurality of nodes, which may be arranged in the layers. Examples of the layers may be, but are not limited to, a convolutional layer, an activation layer, an average pool layer, a max pool layer, a concatenated layer, a dropout layer, a fully connected layer, a SoftMax layer, and so on.

The machine learning module may be trained using at least one network learning method to rank the one or more intents associated with the domains and action devices and provide information about the valid number of domains and/or the action devices for the one or more intents. Examples of the network learning method may be, but are not limited to, supervised learning, unsupervised learning, semi-supervised learning, reinforcement learning, regression-based learning, and so on. A function associated with the network learning method may be performed through the non-volatile memory 302, the volatile memory, and the controller 310. The controller 310 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or a plurality of processors may rank the one or more intents (each mapping of intents) with respect to each portion and provide information about the valid number of domains and/or the action devices for the one or more intents in accordance with a predefined operating rule of the machine learning module, stored in the non-volatile memory and the volatile memory. The predefined operating rules of the machine learning module are provided through training the machine learning module using the network learning method.

Here, being provided through the network learning method denotes that, by applying the network learning method to a plurality of learning data (e.g., training data depicting a mapping of a plurality of intents with the domains and the action devices, previous rankings of the mapped plurality of intents, or the like), a predefined operating rule or AI model of a desired characteristic is made. Ranking the one or more intents and providing information about the valid number of domains and/or the action devices for the one or more intents may be performed in the electronic device 204 itself in which the network learning according to an embodiment is performed, and/or may be implemented through a separate server/system.

Embodiments herein explain the ranking of the one or more intents and providing information about the valid number of domains and/or the action devices for the one or more intents using the NCF model, as an example, but any machine learning module may be considered.

Figure 5A:
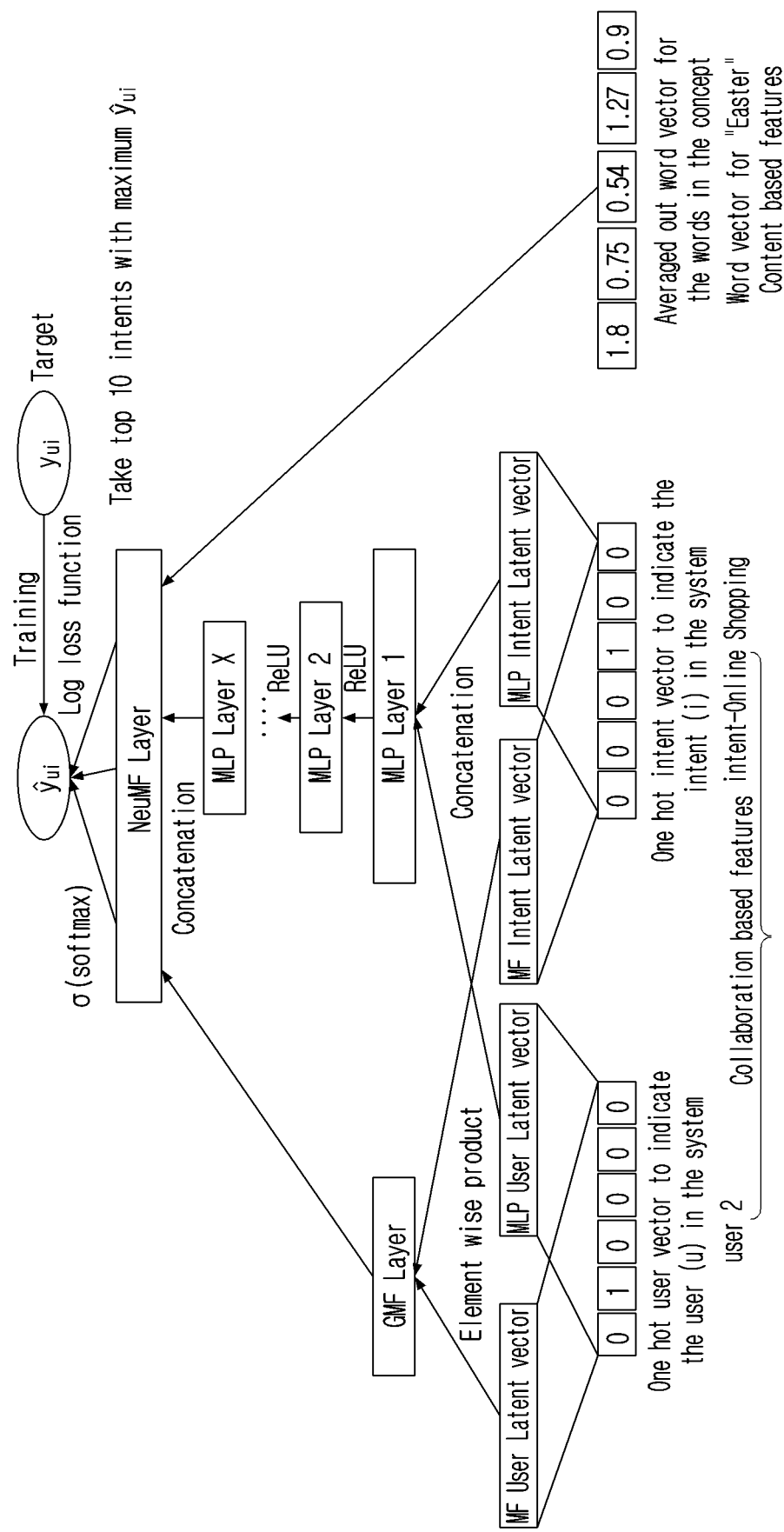
FIGS. 5A and 5B are example diagrams depicting training and usage of a neural collaborative filtering (NCF) model to rank intents associated with each portion of a response, according to various embodiments of the disclosure.
Figure 5B:
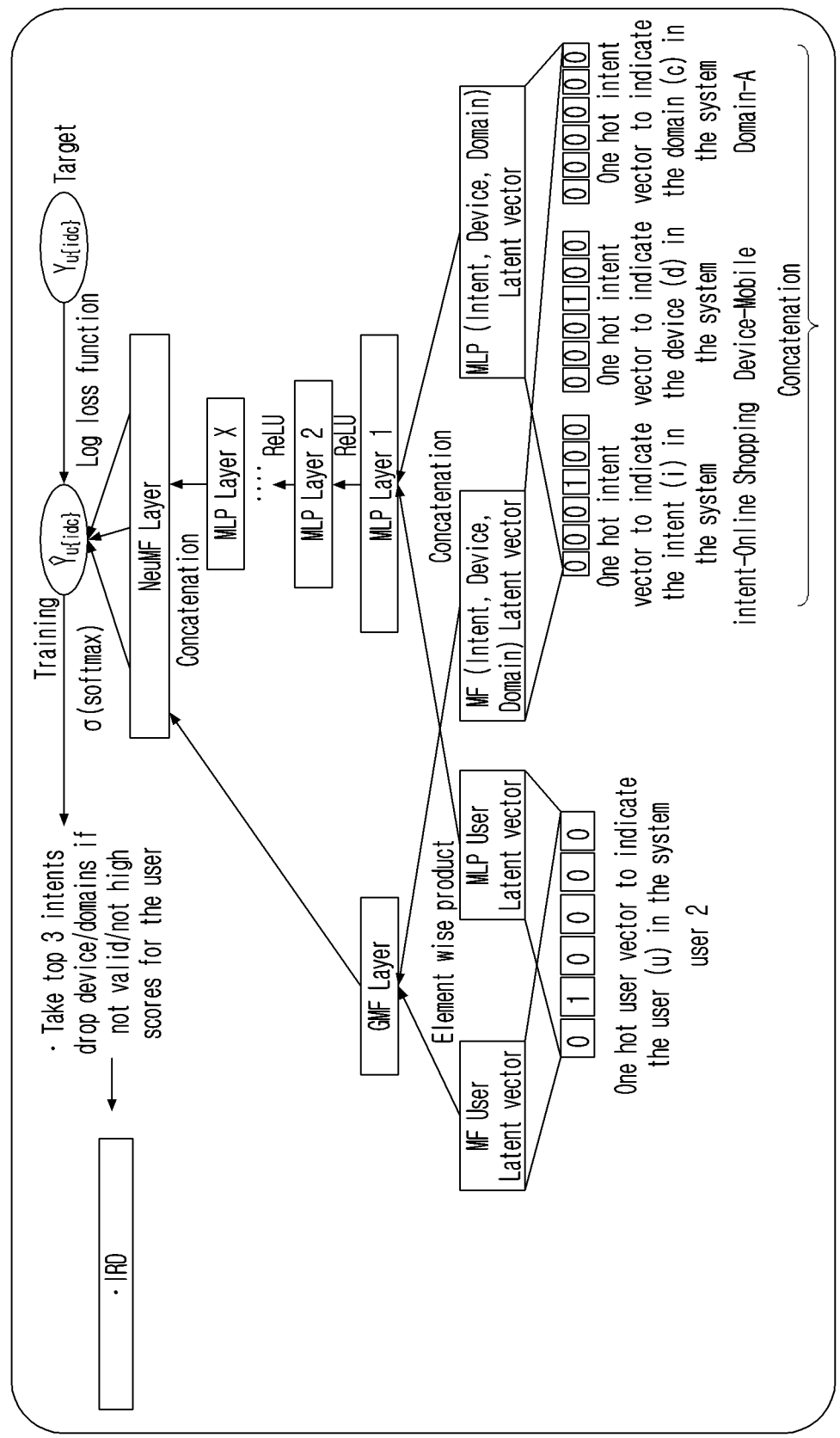

FIGS. 5A and 5B are example diagrams depicting training and usage of a neural collaborative filtering (NCF) model to rank intents associated with each portion of a response, according to various embodiments of the disclosure.

Referring to FIG. 5A, a ranking module 412 trains the NCF model using an ensemble of general matrix factorization (GMF) and multi-layer perceptron (MLP) to learn a user-item interaction function. The MLP may be a probabilistic model that emphasizes a binary property of an implicit data. The user-item interaction function referred herein may provide a mapping of the user preferences (referred as the user in FIGS. 5A, and 5B) with the intents. The user-item interaction function unifies strengths of linearity of the GMF and the non-linearity of the MLP for modeling the user-item interaction function (also be referred as a user-item latent structures).

The GMF and the MLP includes separate embedding layers such as GMF layers, and the MLP layers, respectively. The embedding layers are fully connected layers that project a sparse representation of a one hot user vector and a one hot intent vector to a dense vector, thereby obtaining user/intent embeddings. The one hot user vector ($v_u^U$) indicates the user/user preferences in the IoT system 100. The one hot intent vector ($v_i^I$) indicates the intents in the IoT system 100. The obtained user/intent embeddings may be latent user/intent vectors.

The GMF applies a linear kernel to model the user-item interaction function (e.g., a Vanilla Matrix Factorization (MF)). The GMF replicates the Vanilla MF by an element-wise product of an MF user latent vector and an MF intent latent vector and provides an output (hereinafter referred as GMF output) to a Neural Matrix Factorization (NeuMF) layer. The MF user latent vector and the MF intent latent vector may be derived from the one hot user vector and the one hot intent vector, respectively. In an example, the MF user latent vector ($p_u^G$) and the MF intent latent vector ($q_i^G$) may be represented as:

$$p_u^G = P_G^T v_u^U$$

$$q_i^G = Q_G^T v_i^I$$

wherein $P_G^T$ and $Q_G^T$ may be embedding matrices for the GMF, where P is of size (M (number of users)*k) and Q is of size (number of intents*k), wherein 'k' is a latent space size.

In an example, the element-wise product of the MF user latent vector and the MF intent latent vector may be represented as:

$$\emptyset^{GMF} = p_u^G \odot q_i^G$$

wherein, $p_u^G$ and $q_i^G$ are latent vectors of size k for the GMF for the user and the intent.

The MLP considers a concatenation of an MLP user latent vector and an MLP intent latent vector as an input. The MLP user latent vector and the MLP intent latent vector may be derived from the one hot user vector and the one hot intent vector, respectively. The MLP uses ReLU activations on the input over the multiple neural/MLP layers to model non-linear interactions (referred hereinafter as an MLP output). A number of MLP layers used to model the non-linear interactions may be a hyperparameter. The MLP provides the MLP output to the NeuMF layer.

In an example, the MLP user latent vector ($p_u^M$) and the MLP intent latent vector ($q_i^M$) may be represented as:

$$p_u^M = P_M^T v_u^U$$

$$q_i^M = Q_M^T v_i^I$$

wherein $P_M^T$ and $Q_M^T$ may be embedding matrices of the same sizes learned separately.

In an example, an MLP vector capturing the non-linear interactions/dependencies of the user and intent vector may be represented as:

$$\emptyset^{MLP} = a_L(W_L^T(a_{L-1}(\ldots a_2(W_2^T[_{q_i^M}{}^{p_u^M}]+b_2) \ldots))+b_L$$

wherein $a_L$ is an activation function of Lth layer of the MLP (typically ReLU) and $W_L$, $b_L$ are the weights and biases (model parameters) of the Lth layer of the MLP.

The NeuMF layer receives the GMF output, the MLP output, and an averaged-out word vector for words in a concept (e.g., the query). The NeuMF layer concatenates the GMF output, the MLP output, and the averaged-out word vector, and passes the concatenated GMF output, MLP output and averaged out word vector to a Softmax function for determining a final probability score for the intents. In an example, the final probability score determined for the intents may be represented as:

$$\hat{y}_{ui} = \sigma(h^T \begin{bmatrix} \emptyset^{GMF} \\ \emptyset^{MLP} \\ WV \end{bmatrix})$$

wherein, 'σ' is Softmax at the NeuMF layer to calculate the final probability score, 'h' is a weight matrix of the last NeuMF layer, and 'WV' is a word vector for the concept/portions of the response extracted for which the intent is being selected.

On calculating the final probability scores for the intents, the ranking module 412 computes a cross entropy loss with positive instances (Y) from observed interactions and negative instances (Y⁻) being uniformly sampled from unobserved interactions from a utility matrix. The ranking module 412 may maintain and store the utility matrix in the memory 302 for given phrases, based on implicit and explicit preferences of the user. The implicit and explicit preferences of the user may indicate user interested domains and action devices. The utility matrix may include at least one of a utility matrix depicting the intents (intent utility matrix), a utility matrix depicting the user interested domains (domain utility matrix), and a utility matrix depicting the user interested action devices (device utility matrix). The intent utility matrix denotes observations of usage of all the intents related to a concept type (extracted previously). The domain utility matrix denotes observations of the user preferences towards the various domains. The device utility matrix denotes observations of the user preferences towards the various action devices/user devices 202a-202n. In the utility matrix, '1' represents the positive instances/observation example/positive example, and '0' represents the unobserved interactions (not a negative example, depicting that the intents have not been just observed). An example intent utility matrix for a holiday event is depicted in FIG. 5C. An example domain utility matrix for an example intent "Play Music" is depicted in FIG. 5D. An example device utility matrix for an example intent "Play Music" is depicted in FIG. 5E.

FIGS. 5C, 5D, and 5E depict an intent utility matrix, a domain utility matrix, and a device utility matrix, respectively, according to various embodiments of the disclosure.

In an example, the cross entropy loss may be computed as:

$$L = - \sum_{(u,i) \in Y \cup Y^-} y_{ui} \log \hat{y}_{ui} + (1 - y_{ui}) \log(1 - \hat{y}_{ui})$$

wherein, $\hat{y}_{ui} y_{ui}$ represents the determined final probability score and target score {0, 1}, respectively.

The ranking module 412 further trains the NCF model using the cross entropy loss. Training the NCF model using the cross entropy loss includes updating parameters of the NCF model based on the cross entropy loss. Examples of the parameters may be, but are not limited to, activation functions, biases, input weights, output weights, and so on, related to the layers of the NCF model. The trained NCF model may be a model in which a number of layers, a sequence for processing the layers and parameters related to each layer may be known and fixed for ranking the intents and provide the valid number of domains/action devices with respect to each intent.

The ranking module 412 uses the trained NCF model to rank the intents and provide the valid number of domains/action devices with respect to each intent. Referring to FIG. 5B, for ranking the intents, the ranking module 412 provides the user preferences/one hot user vector, the intents/one hot intent vector, the domains/one hot intent vector depicting domains, the action devices/one hot intent vector depicting action devices, or the like to the trained NCF model. The trained NCF model processes the user preferences, the intents, the domains, the action devices, and so on, to rank the intents and provide the valid number of domains/action devices with respect to each intent. The trained NCF model considers a pre-defined number of highest ranking intents (e.g., top 3 intents) and the associated domains and action devices. The trained NCF model discards/drops the domains and the actions devices that have been associated with the intents that have not been present in the top 3 intents or the domains and the action devices that have not been valid. The trained NCF model provides the top 3 intents and the associated domains and action devices to an Intelligent Device Resolver (IDR), which provides the phrase mapping of the portions of the response with the intent and the associated domains and the action devices.

The ranking module 412 provides the ranking/scores of the one or more intents to the distinguishing module 414.

The distinguishing module 414 may be configured to distinguish the one or more portions of the response. The distinguishing module 414 determines the actionable information for each portion of the response by analyzing at least one of ranking of the intents identified in relation to the corresponding portion, the domains and the action devices associated with the intents identified in relation to the corresponding portion, the user preferences, the usage history of the user devices 202a-202n, and so on. The distinguishing module 414 links the actionable information with the respective one or more portions of the response. The actionable information of the portion depicts the one or more actions that may be performed with respect to the corresponding portion. The distinguishing module 414 distinguishes the one or more portions of the response linked with the actionable information. In an embodiment, the distinguishing module 414 distinguishes the one or more portions of the response by hyperlinking the one or more portions. In another embodiment, the distinguishing module 414 distinguishes the one or more portions of the response by creating the one or more objects/virtual objects for the one or more portions. The distinguishing module 414 provides the distinguished one or more portions of the response to the user through the outputter 308. Thus, the user may select the distinguished one or more portions of the response to obtain the associated actionable information. The distinguishing module 414 provides the distinguished one or more portions of the response linked with the actionable information to the action module 416.

The action module 416 may be configured to perform the one or more actions depicted by the actionable information that has been linked with the one or more portions of the response. The action module 416 may perform the one or more actions on the electronic device 204. Alternatively, the action module 416 may perform the one or more actions on the action devices/user devices 202a-202n.

In an example, the action module 416 may perform the one or more actions automatically, on distinguishing the one or more portions of the response. In another example, the action module 416 may perform the one or more actions, on receiving the selection inputs from the user. The selection inputs depict the distinguished one or more portions of the response selected by the user.

FIGS. 3 and 4 show various blocks of the electronic device 204, but it is to be understood that other embodiments are not limited thereon. In other embodiments, the electronic device 204 may include less or more number of blocks. Further, the labels or names of the blocks are used only for illustrative purpose and does not limit the scope of the embodiments herein. One or more blocks can be combined together to perform same or substantially similar function in the electronic device 204.

Figure 6:
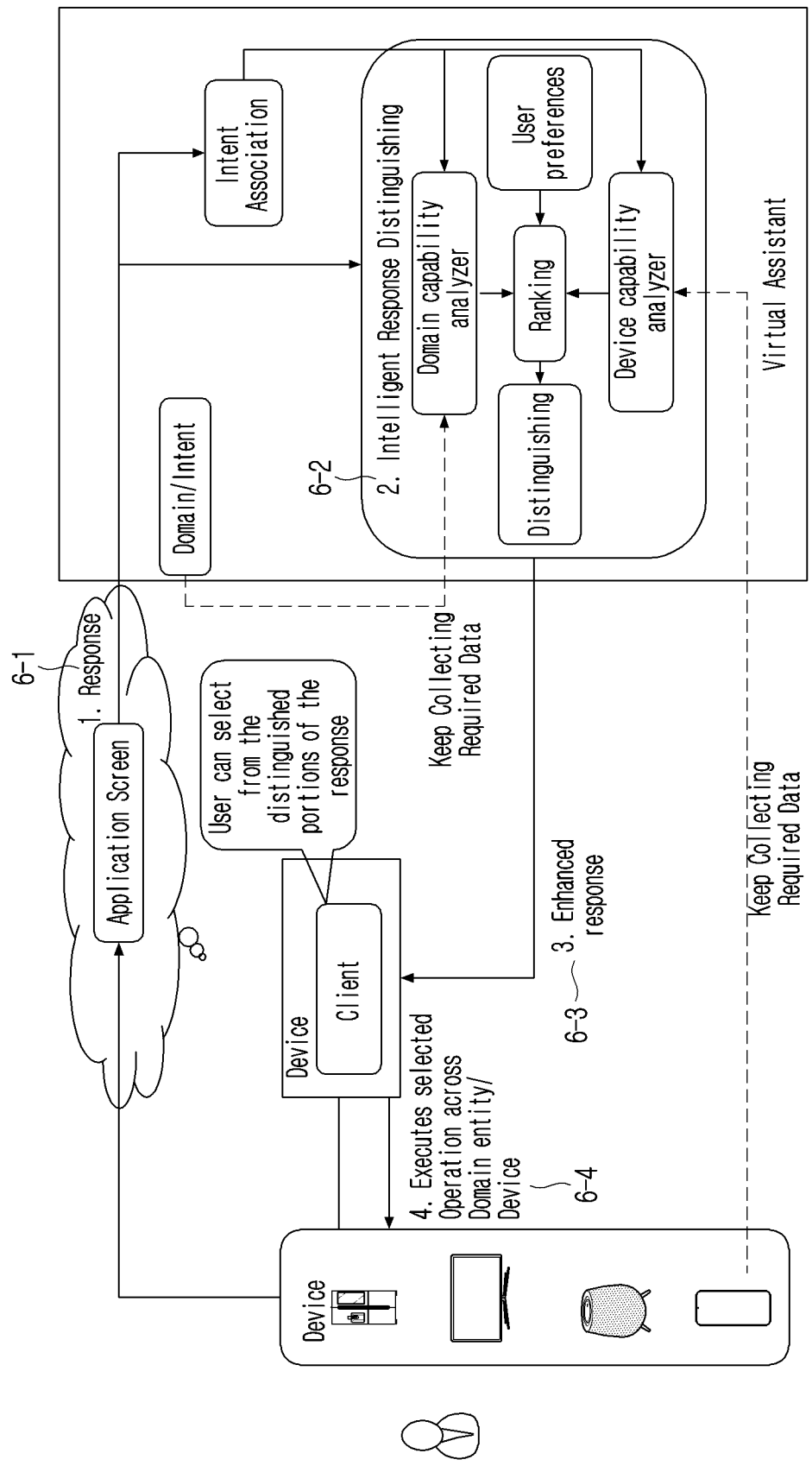
FIG. 6 is an example conceptual diagram depicting providing an enhanced response to a query and performing one or more actions based on the enhanced response, according to an embodiment of the disclosure.

FIG. 6 is an example conceptual diagram depicting providing the enhanced response to the query and performing the one or more actions based on the enhanced response, according to an embodiment of the disclosure.

Referring to FIG. 6, in operation 6-1, an electronic device 204 receives the query from the user and generates the response for the query. On generating the response, the electronic device 204 identifies the one or more portions of the response and associates the one or more intents with each of the one or more portions of the response.

In operation 6-2, the electronic device 204 enhances the response by distinguishing the one or more portions of the response. For distinguishing the one or more portions of the response, the electronic device 204 determines the one or more domains for each intent based on at least one of, but is not limited to, the user preferences, the usage history of the one or more of the plurality of user devices 202a-202n, and so on. The electronic device 204 also determines the one or more action devices from the user devices 202a-202n for each intent based on at least one of, but is not limited to, the user preferences, the usage history of the one or more of the plurality of user devices 202a-202n, and so on.

On determining the one or more domains and the one or more action devices for each intent, the electronic device 204 ranks each mapping of intents (i.e., each intent associated with the domains and action devices) for each portion of the response by processing at least one of, but is not limited to, the one or more domains and the one or more action devices associated with the intent, the user preferences, the usage history of the one or more of the plurality of user devices 202a-202n, and so on, using the learning method. The electronic device 204 generates the actionable information for each portion of the response based on the ranking of the associated intent, the user preferences, the domains, and the action devices associated with the intent, and so on. The electronic device 204 links the actionable information with the respective portions of the response. The electronic device 204 enhances the response by distinguishing the one or more portions of the response linked with the actionable information.

In operation 6-3, the electronic device 204 provides the enhanced response to the user. The electronic device 204 allows the user to select any of the distinguished portions of the enhanced response. On selecting the distinguished portion of the enhanced response, the user may obtain the actionable information linked with the selected portion. The actionable information may depict the one or more actions. The electronic device 204 further allows the user to select the one or more actions associated with the selected actionable information.

In operation 6-4, the electronic device 204 performs the one or more actions selected by the user. Alternatively, the electronic device 204 may also allow the user devices/action devices to perform the one or more action selected by the user.

Figure 7:
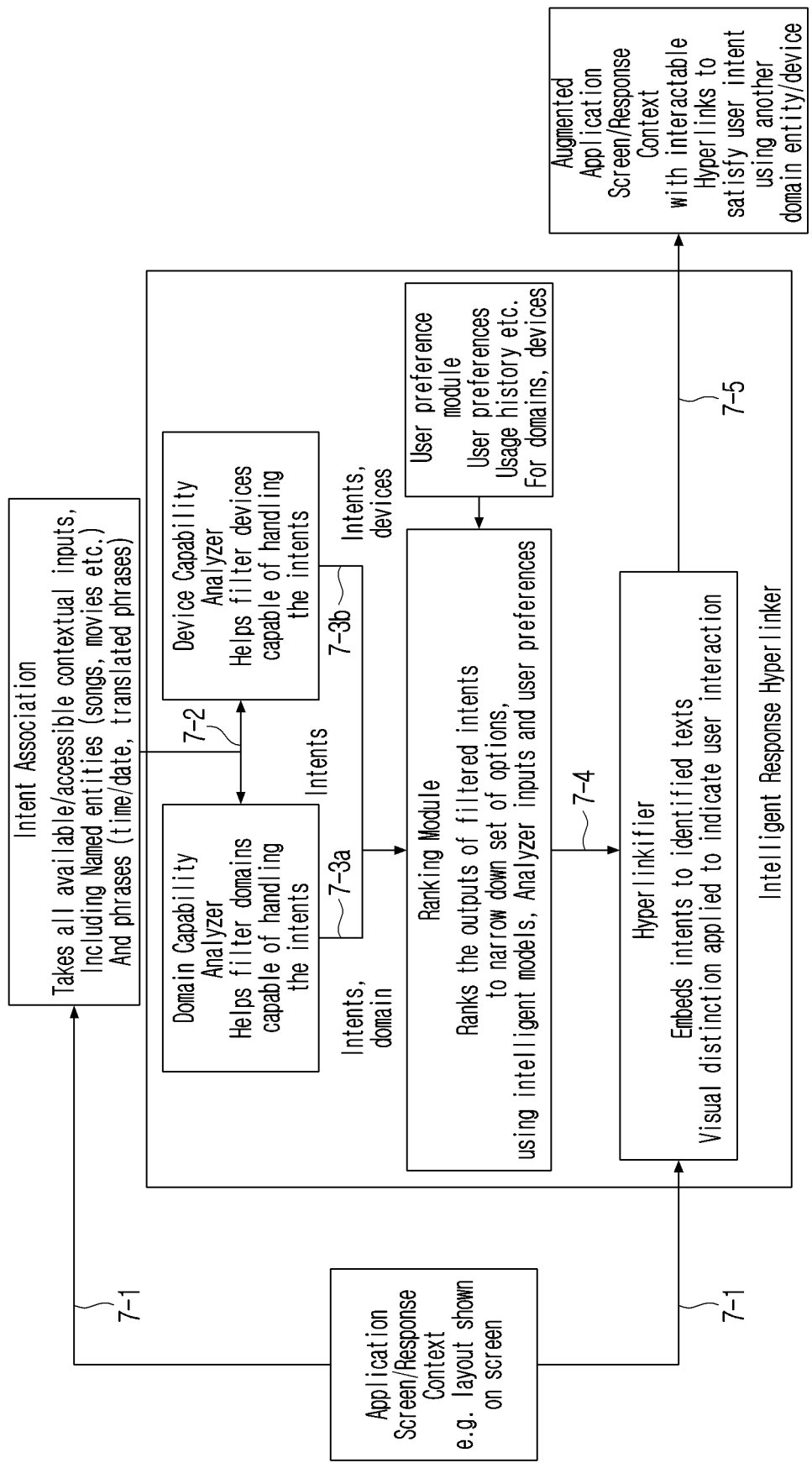
FIG. 7 is an example flow diagram depicting a method for providing an enhanced response for a query, according to an embodiment of the disclosure.

FIG. 7 is an example flow diagram depicting a method for providing the enhanced response for the query, according to an embodiment of the disclosure.

At operation 7-1, the electronic device 204 receives the query from the user through the input virtual interface and generates the response for the query.

At operation 7-2, the electronic device 204 extracts the portions/phrases from the response and associates the intents with the portions. The electronic device 204 associates the intents with the portions based on at least one of the contextual inputs (including the named entities such as songs, movies, or the like) and the portions/phrases extracted from the response (e.g., time/date, translated phrases/portions, or the like).

At operation 7-3a, the electronic device 204 determines the domains for which the one or more portions/intents belong to. Thereby, filtering the domains capable of handling the intents. At operation 7-3b, the electronic device 204 determines the action devices from the plurality of user devices 202a-202n for the intents/portions. Thereby, filtering the action devices capable of handing the intents.

At operation 7-4, the electronic device 204 ranks each mapping of intents for each portion of the response, generates the actionable information for the portions of the response based on the ranking of the associated intents and links the actionable information with the respective portions of the response. The electronic device 204 ranks each mapping of intents for each portion of the response based on at least one of the domains and the action devices associated with the intents, the user preferences for the specific domains and action devices, the usage history of the user devices 202a-202n, and so on. The actionable information may be in a form of, the NLU, the natural language text forms, the media, or the like. The actionable information depicts the one or more actions.

At operation 7-5, the electronic device 204 distinguishes the portions/phrases of the response linked with the actionable information. The electronic device 204 hyperlinks or visually distinguishes the portions/phrases of the response to indicate that the user may interact with the corresponding portions/phrases of the response.

At operation 7-5, the electronic device 204 provides the distinguished portions of the response to the user and allows the user to interact with any of the portions. When the user interacts with the distinguished portions, the electronic device 204 provides/shows the associated actionable information.

Figure 8A:
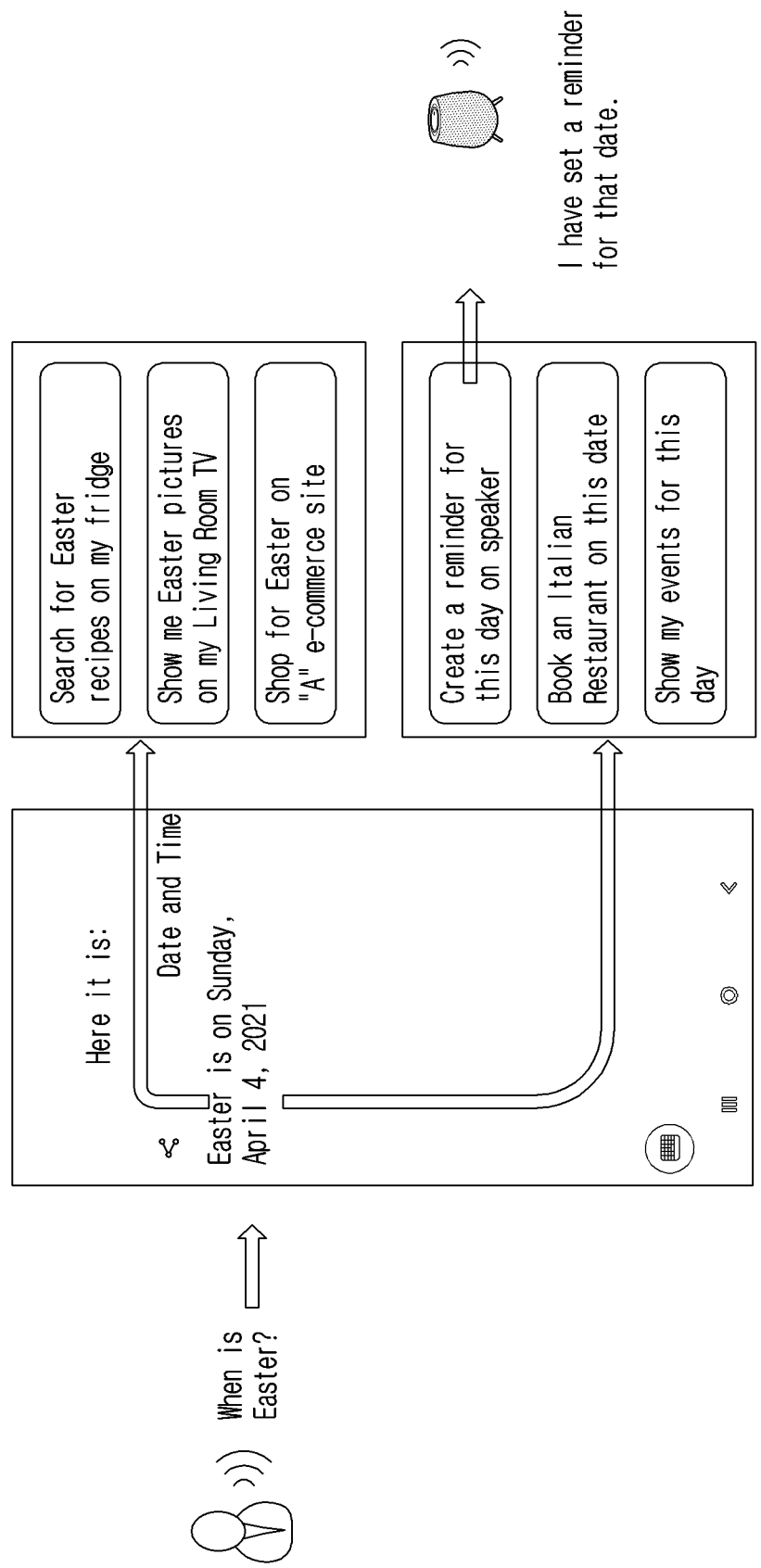
FIGS. 8A, 8B, and 8C are example diagrams depicting a use case scenario of providing an enhanced response to a query, according to various embodiments of the disclosure.
Figure 8B:
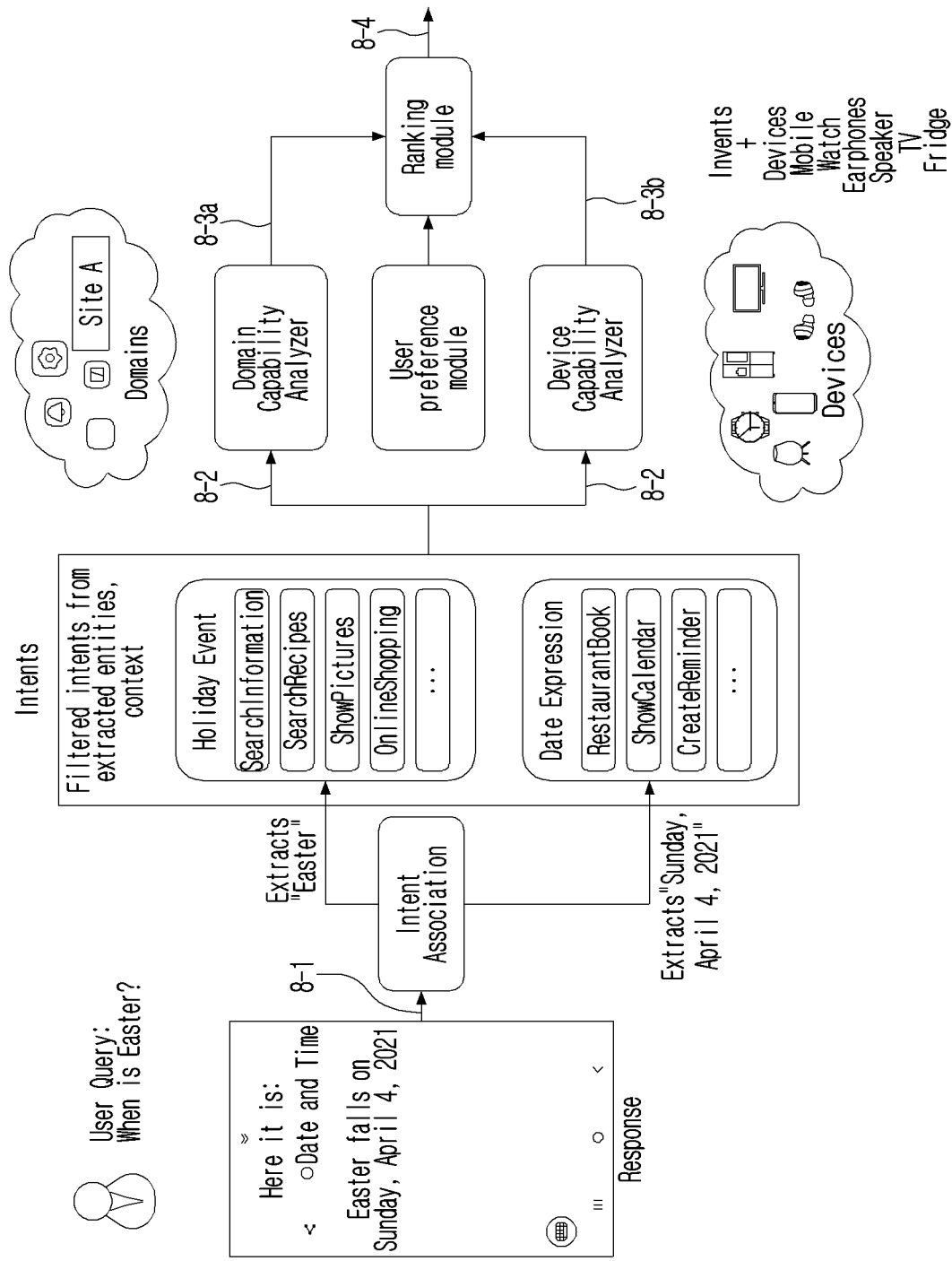
Figure 8C:
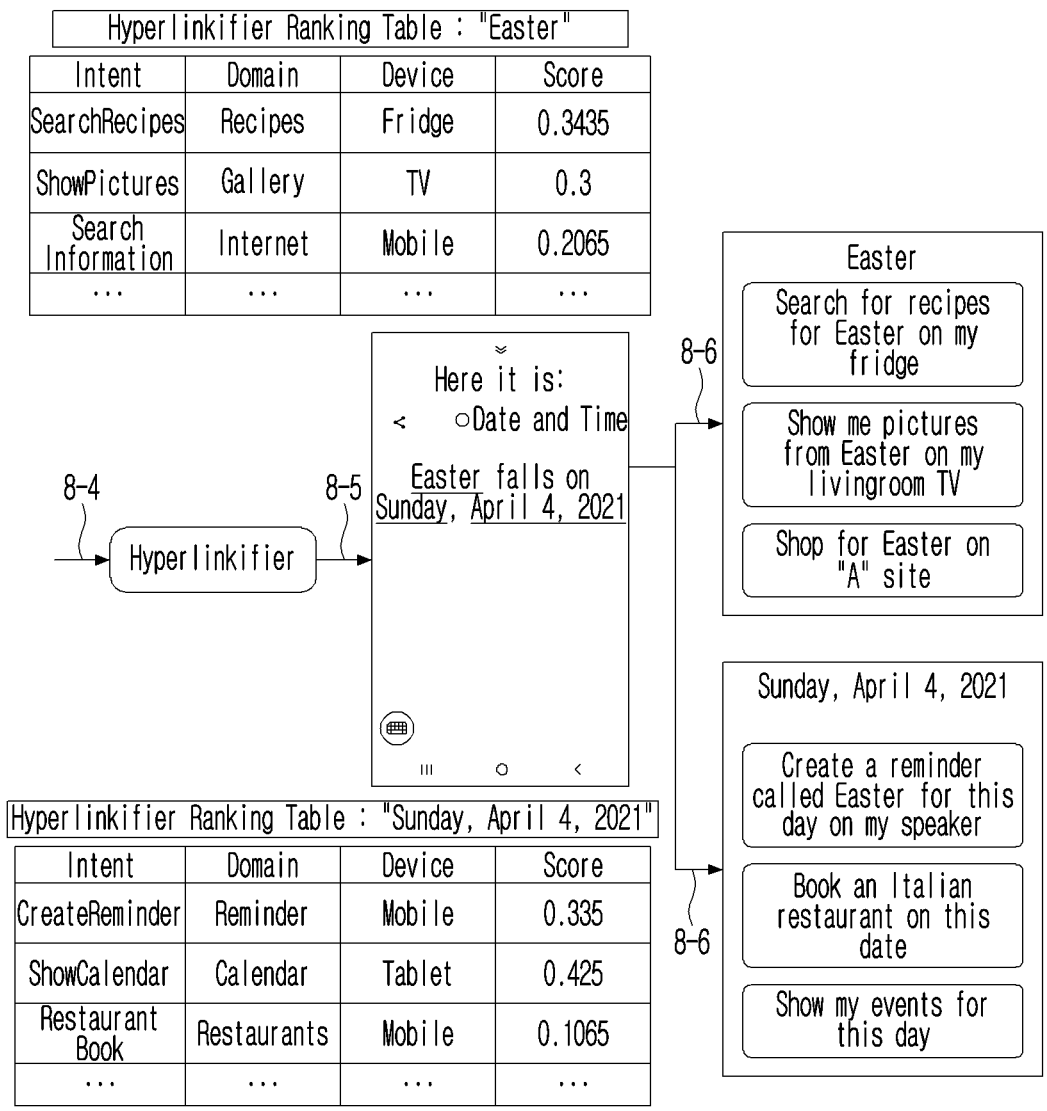

FIGS. 8A, 8B, and 8C are example diagrams depicting an example use case scenario of providing the enhanced response to the query, according to various embodiments of the disclosure.

Referring to FIG. 8A, consider an example scenario, in which an electronic device 204 receives an example query "When is Easter" from the user through the voice assistant module (an example of the input virtual interface). In such a scenario, the electronic device 204 provides the enhanced response "Easter is on Sunday, Apr. 4, 2021," wherein the portions/phrases of the response such as "Easter," "Sunday, Apr. 4, 2021," are hyperlinked to indicate to the user that the user may interact with the corresponding portions/phrases of the response. When the user selects any one of the hyperlinked portion, the electronic device 204 provides the actionable information associated with the selected portion to the user. The actionable information depicts the one or more actions. In an example, if the user selects the portion "Easter," the electronic device 204 provides the actionable information depicting the actions such as "search for Easter recipes on my fridge," "show me Easter pictures on my living room TV," and "shop for Easter on 'A e-commerce site'." In another example, if the user selects the portion "Sunday, Apr. 4, 2021," the electronic device 204 provides the actionable information such as "create a reminder for this day on a speaker/voice assistant module," "book an Italian restaurant on this date," and "show my events for this day." The electronic device 204 further allows the user to select the actionable information. When the user selects the actionable information, the electronic device 204 performs the action associated with the actionable information that have been selected by the user. In an example herein consider that the user selects the actionable information "create a reminder for this day on a speaker/voice assistant module." In such a scenario, the electronic device 204 sets a reminder for the data "Apr. 24, 2021," on the voice assistant module and allows the voice assistant module to indicate to the user that "I have set a reminder for that date."

Providing the enhanced response for the example query "When is Easter?" is described in detail in FIGS. 8B and 8C.

Figure 8D:
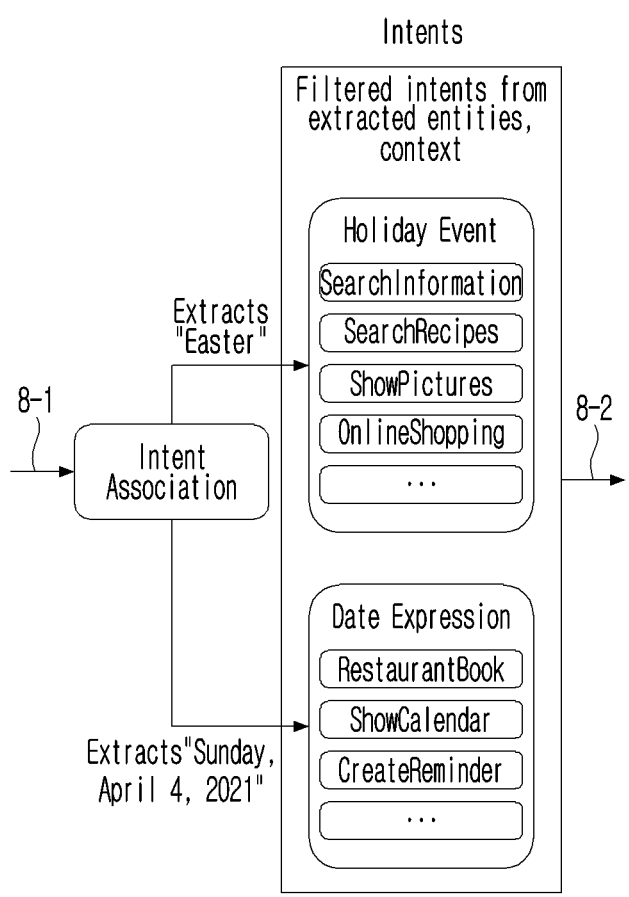
FIG. 8D is an example diagram depicting association of one or more intents with each portion of a response, according to an embodiment of the disclosure.

FIG. 8D is an example diagram depicting association of the one or more intents with each portion of the response, according to an embodiment of the disclosure.

Referring to FIGS. 8B and 8C, at operation 8-1, an electronic device 204 generates the response "Easter is on Sunday, Apr. 4, 2021," for the query "When is Easter?" At operation 8-2, the electronic device 204 extracts the portions/phrases from the response and determines the intents for each portion. Determining the intents for each portion is described in detail in FIG. 8D. Referring to FIG. 8D, the electronic device 204 extracts the portions such as "Easter," and "Sunday, Apr. 4, 2021," from the response, at operation 8-1. The electronic device 204 identifies that the portion "Easter" relates to a holiday event and determines the intents such as "search information," "search recipes," "show pictures," and "online shipping" for the portion "Easter," in operation 8-2. The electronic device 204 identifies that the portion "Sunday, Apr. 4, 2021," relates to a date expression and determines the intents such as "restaurant book," "show calendar," and "create reminder" for the portion "Sunday, Apr. 4, 2021."

Figure 8E:
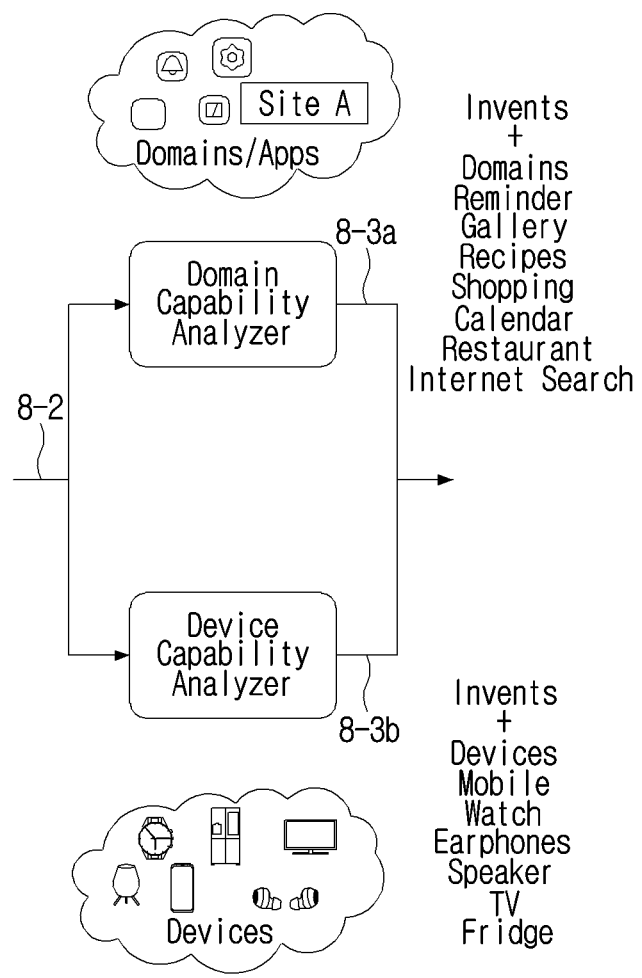
FIG. 8E is an example diagram depicting determination of domains and action devices for each intent, according to an embodiment of the disclosure.

FIG. 8E is an example diagram depicting determination of domains and action devices for each intent, according to an embodiment of the disclosure.

Referring to FIG. 8E, on determining the intents for each of the portions extracted response, at operation 8-3*a*, the electronic device 204 determines the domains for the intents determined for the portions "Easter" and "Sunday, Apr. 4, 2021," of the response. At operation 8-3*b*, the electronic device 204 determines the action devices from the plurality of user devices 202*a*-202*n* for the intents determined for the portions "Easter" and "Sunday, Apr. 4, 2021," of the response. In an example, referring to FIG. 8E, the electronic device 204 determines the domains such as "reminder," "gallery," "recipes," "shopping," "calendar," "restaurants," and "Internet search" for the intents. In an example, referring to FIG. 8E, the electronic device 204 determines the actions devices such as "mobile," "watch," "earphones," "speaker," "Television (TV)," and "fridge" for the intents.

Figure 8F:
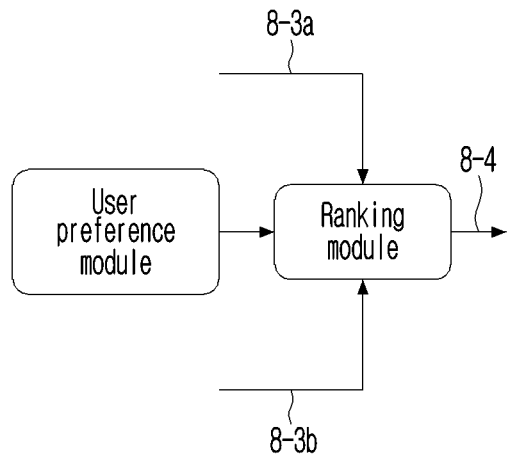
FIG. 8F is an example diagram depicting ranking of intents with respect to each portion of a response, according to an embodiment of the disclosure.

FIG. 8F is an example diagram depicting ranking of the intents with respect to each portion of the response, according to an embodiment of the disclosure.

Referring to FIG. 8F, at operation 8-4, the electronic device 204 ranks the intents determined in relation to the portions "Easter" and "Sunday, Apr. 4, 2021," of the response. For ranking the intents, the electronic device 204 forms the mapping of the intents with respect to the associated domains and action devices. The electronic device 204 further analyzes each of the mapping of intents and the user preferences using the learning method to rank the intents with respect to each portion of the response and provide the valid domains and action devices with respect to each intent. In an example, the ranking/score of each intent with respect to the associated domains and the action devices for the portions "Easter" and "Sunday, Apr. 4, 2021," is depicted in FIG. 8F.

Figure 8G:
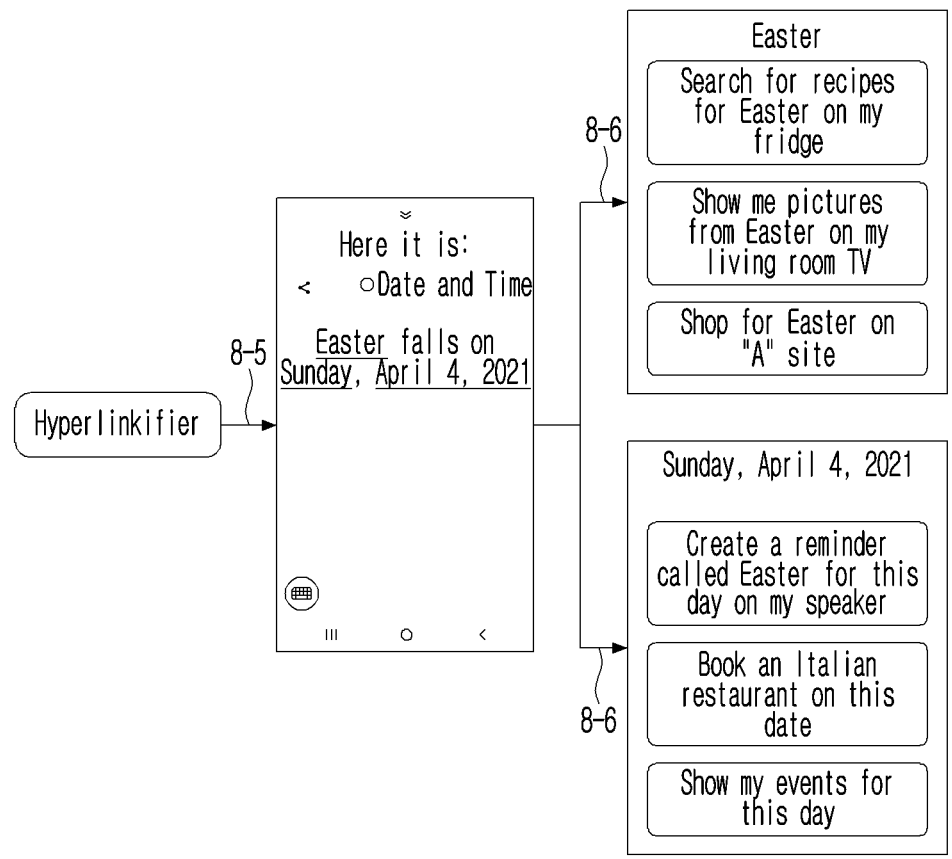
FIG. 8G is an example diagram depicting distinguishing one or more portions of a response linked with actionable information, according to an embodiment of the disclosure.

FIG. 8G is an example diagram depicting distinguishing the one or more portions of the response linked with actionable information, according to an embodiment of the disclosure.

Referring to FIG. 8G, at operation 8-5, the electronic device 204 generates the actionable information for the portions of "Easter" and "Sunday, Apr. 4, 2021," of the response based on the ranking of each intent, the domains and the action devices associated with each intent, and the user preferences. The electronic device 204 links the actionable information with the portions/intents of the response. The electronic device 204 hyperlinks each portion of the response, which has been linked with the actionable information. In an example, referring to FIG. 8G, the electronic device 204 generates the actionable information in a form of natural language sentences. The electronic device 204 generates the actionable information such as "search for Easter recipes on my fridge," "show me Easter pictures on my living room TV," and "shop for Easter on 'A e-commerce site' for the portion 'Easter'." The electronic device 204 generates the actionable information such as "create a reminder for this day on a speaker/voice assistant module," "book an Italian restaurant on this date," and "show my events for this day" for the portion "Sunday, Apr. 4, 2021." The electronic device 204 links the generated actionable information with respective portions "Easter" and "Sunday, Apr. 4, 2021," of the response. The electronic device 204 then hyperlinks the "Easter" and "Sunday, Apr. 4, 2021," of the response (i.e., distinguishing the portions of the response) and provides the hyperlinked portions of the response to the user through the output virtual interface. Hyperlinking the portions of the response distinguishes/makes the identified portions of the response interactable in the output virtual interface.

At operation 8-6, the electronic device 204 allows the user to interact with the hyperlinked portions "Easter" and "Sunday, Apr. 4, 2021," of the response. The electronic device 204 further shows the actionable information/options linked with the interacted portions to the user to execute further actions (on the electronic device 204 or the action devices/user devices 202*a*-202*n*) associated with the actionable information. The electronic device 204 may also categorize the actionable information based on the associated commonality.

Figure 9A:
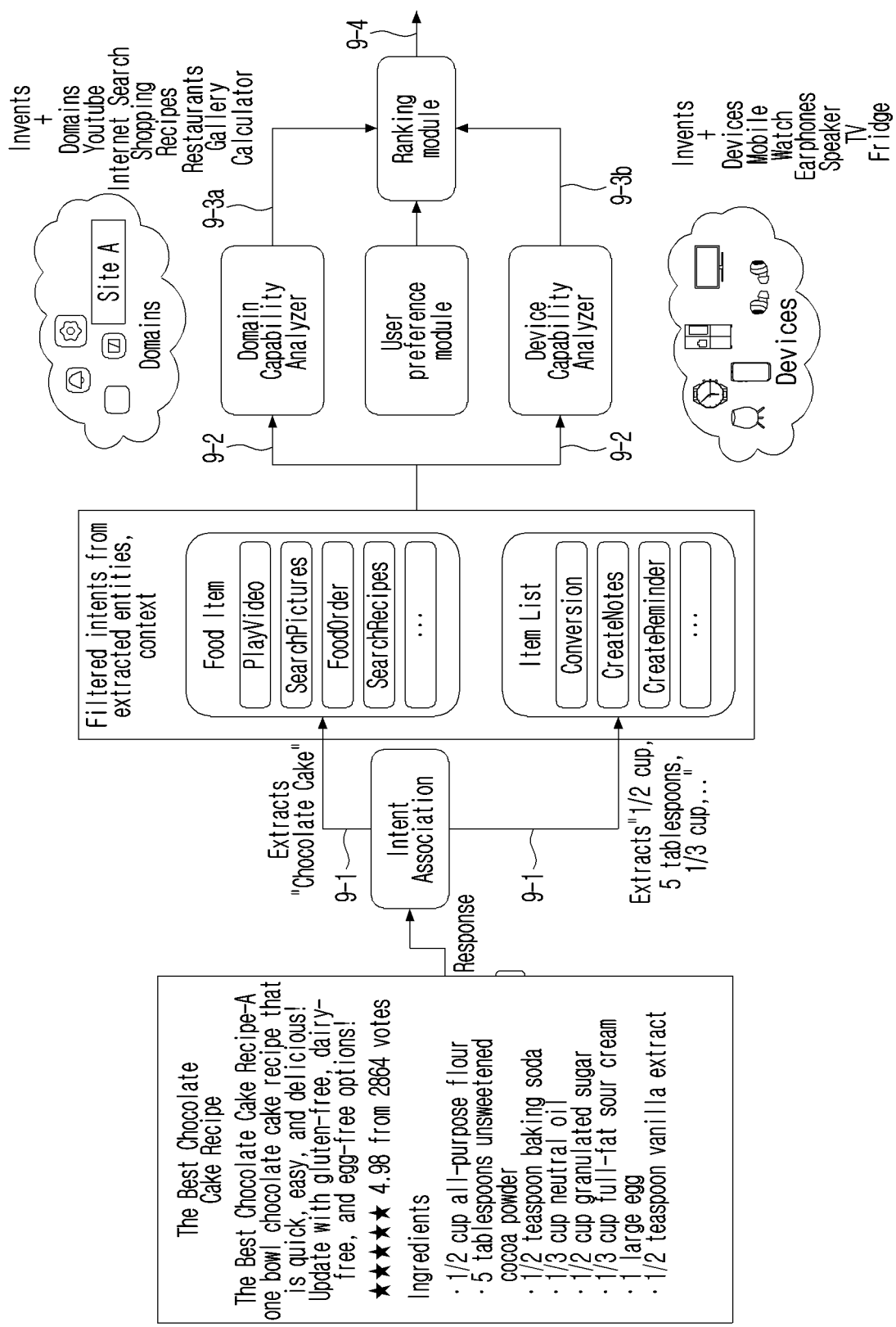
FIGS. 9A, 9B, and 9C are example diagrams depicting a use case scenario of providing an enhanced response to a user, while the user is checking a chocolate cake recipe on a website, according to various embodiments of the disclosure.
Figure 9B:
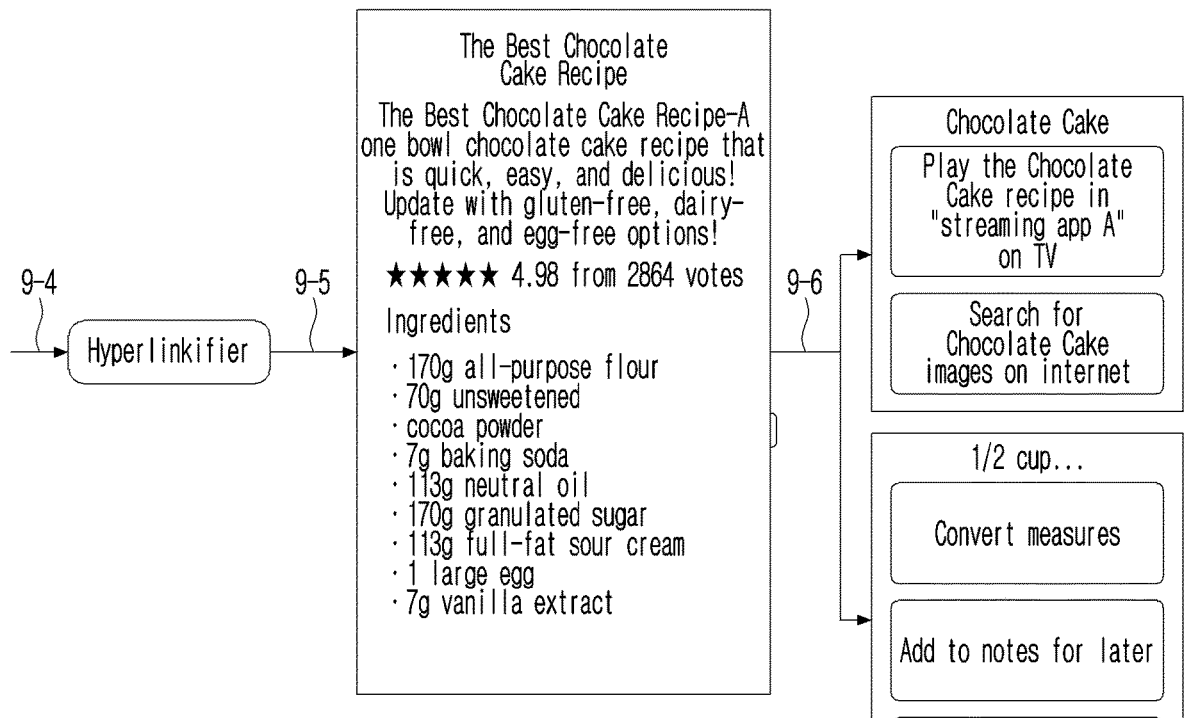
Figure 9C:
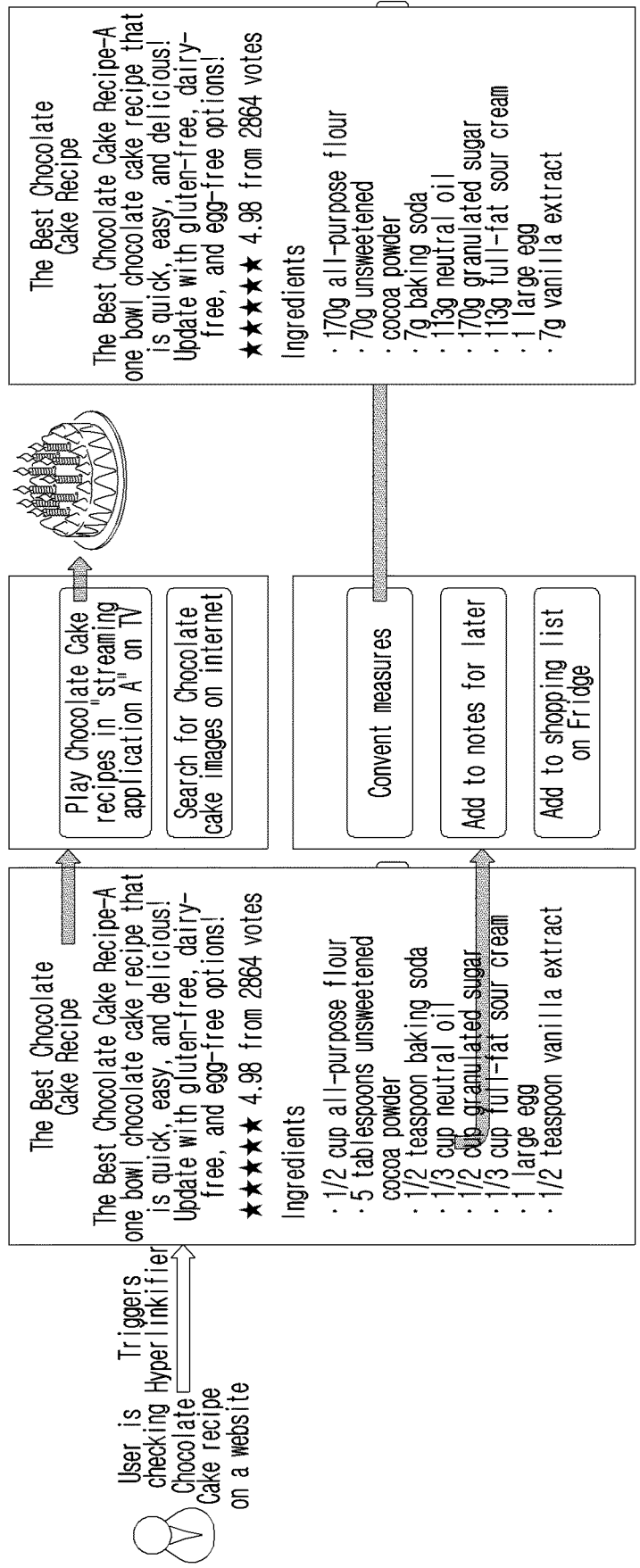

FIGS. 9A, 9B, and 9C are example diagrams depicting a use case scenario of providing the enhanced response to the user, while the user is checking a chocolate cake recipe on a website, according to various embodiments of the disclosure.

Referring to FIGS. 9A, 9B, and 9C, at operation 9-1, the user checks for a chocolate cake recipe on a website (i.e., the query related to the search inputs) and obtains the response including the best chocolate cake recipe with details of ingredients, wherein measurements of the ingredients are in an imperial system. In such a scenario, at operation 9-2, the electronic device 204 extracts the portions such as "Chocolate Cake" and "½ cup, 5 tablespoons, ⅓ cup . . . " (i.e., the measurements of the ingredients) from the response. The electronic device 204 identifies the portion "Chocolate Cake" as a food item and determines the intents such as "Play Video," "Search Pictures," "Food Order," "Search Recipes," or the like for the portion "Chocolate Cake." Similarly, the electronic device 204 identifies the portion "½ cup, 5 tablespoons, ⅓ cup . . . " as an item list and determines the intents such as "Conversion," "Create Notes," "Create Reminder," or the like for the portion "½ cup, 5 tablespoons, ⅓ cup . . . ."

At operations 9-3a and 9-3b, the electronic device 204 determines the domains and the action devices for the intents determined in relation to the portions "Chocolate Cake" and "½ cup, 5 tablespoons, ⅓ cup . . . ." In an example herein, the electronic device 204 determines the domains such as "Streaming application A," "Internet Search," "Shopping," "Recipes," "Restaurants," "Gallery," and "Calculator" for the intents. In another example herein, the electronic device 204 determines the action devices such as "mobile," "watch," "earphones," "speaker," "TV," and "fridge" for the intents.

At operation 9-4, the electronic device 204 ranks the intents associated with each portion of the response. For ranking the intent, the electronic device 204 forms the tuples of the intents with respect to the associated domains and action devices, for each portion and ranks each tuple based on at least one of the intent and the associated domains and action devices, the user preferences, the usage history, or the like. An example ranking/scores of the tuple of intents for the portion "Chocolate Cake" and the portion "½ cup, 5 tablespoons, ⅓ cup . . . " are depicted in FIG. 9A.

At operation 9-5, the electronic device 204 generates the actionable information for the portions "Chocolate Cake," and "½ cup, 5 tablespoons, ⅓ cup . . . " and links the generated actionable information with the portions "Chocolate Cake" and "½ cup, 5 tablespoons, ⅓ cup . . . ." The electronic device 204 hyperlinks the portions "Chocolate Cake" and "½ cup, 5 tablespoons, ⅓ cup . . . " of the response linked with the actionable information.

At operation 9-6, the electronic device provides the hyperlinked portions of the response to the user, which indicate to the user that the hyperlinked portions are interactable portions. The electronic device 204 allows the user to interact with the hyperlinked portions to provide the linked actionable information. In an example herein, if the user interacts with/selects the portion "Chocolate Cake," the electronic device 204 provides the actionable information such as "Play the Chocolate Cake recipe in Streaming application A on TV," and "Search for Chocolate Cake images on the Internet." Similarly, if the user interacts/selects the portion "½ cup, 5 tablespoons, ⅓ cup . . . ," the electronic device 204 provides the actionable information, such as, "Convert measures," "Add to notes for later," and "Add to shopping list in Fridge."

In an example herein referring to FIG. 9B, consider that the user selects the actionable information "Play Chocolate Cake recipes in Streaming application A on TV." In such a scenario, the electronic device performs the action associated with the selected actionable information that is the electronic device 204 plays the chocolate cake recipe in Streaming application A on the TV (i.e., an example of the action devices/user devices 202a-202n).

In an example herein referring to FIG. 9C, consider that the user selects the actionable information "Convert measures." In such a scenario, the electronic device 204 converts the measurements of the ingredients used for the chocolate cake recipe into a metric system and displays the measurements of the ingredients to the user in the metric system.

Figure 10A:
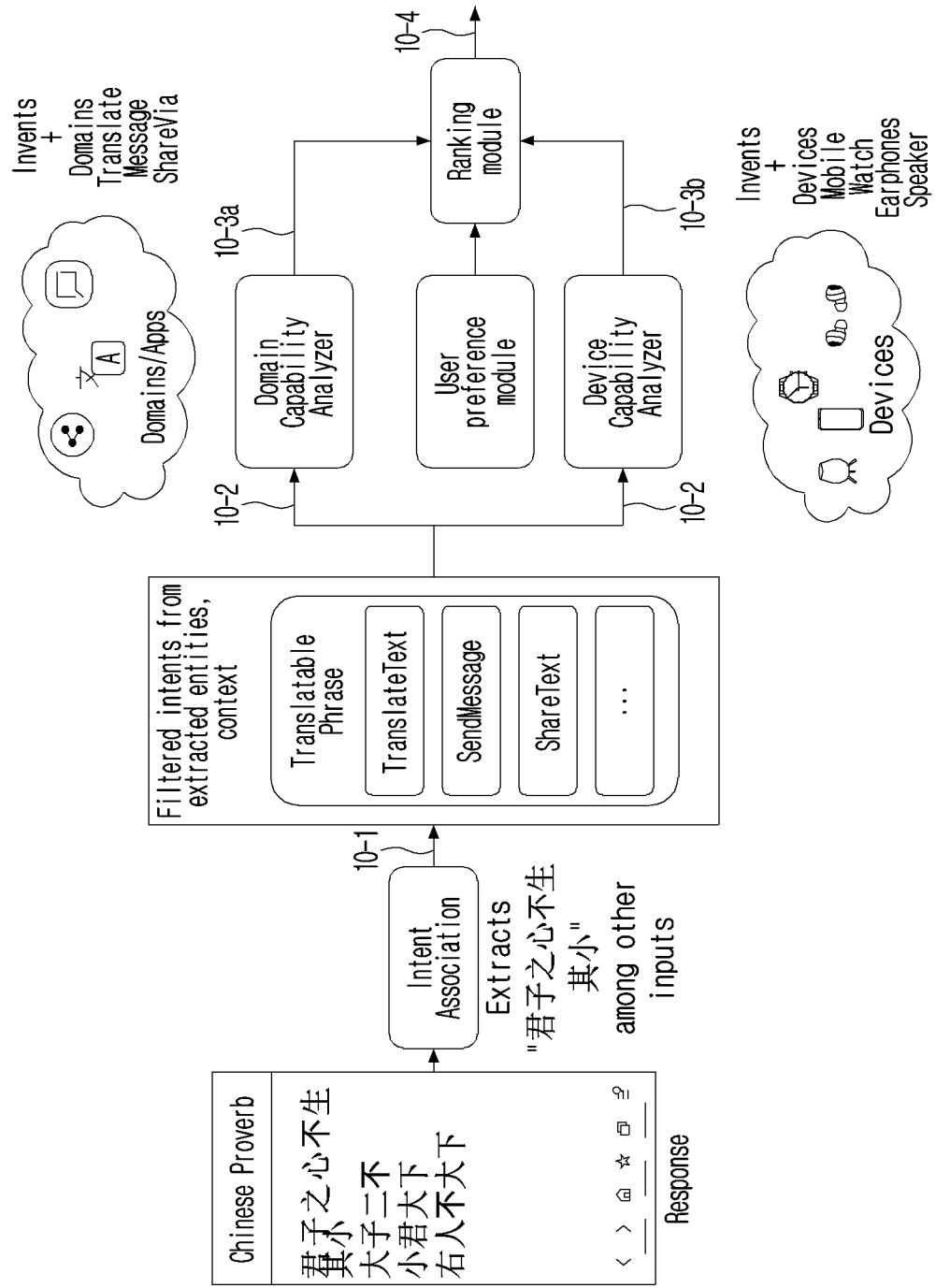
FIGS. 10A, 10B, and 10C are example diagrams depicting a use case scenario of providing an enhanced response to a user, when the user obtains a response in a different language, according to various embodiments of the disclosure.
Figure 10B:
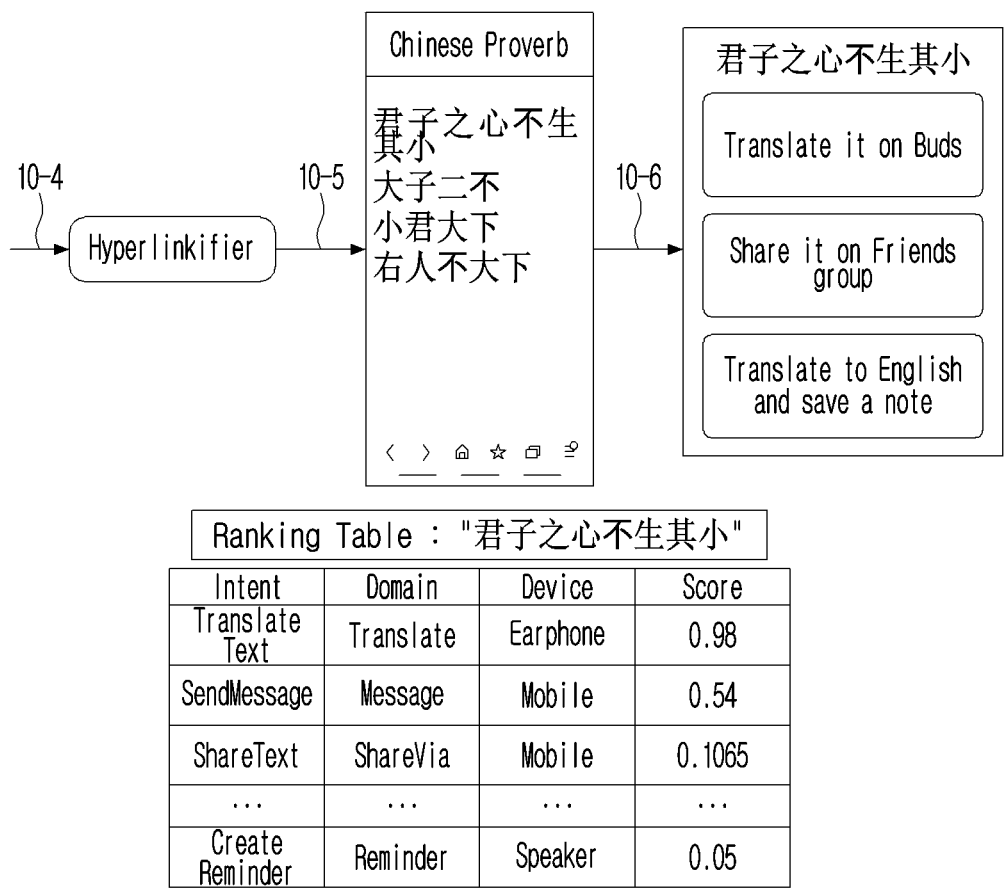
Figure 10C:
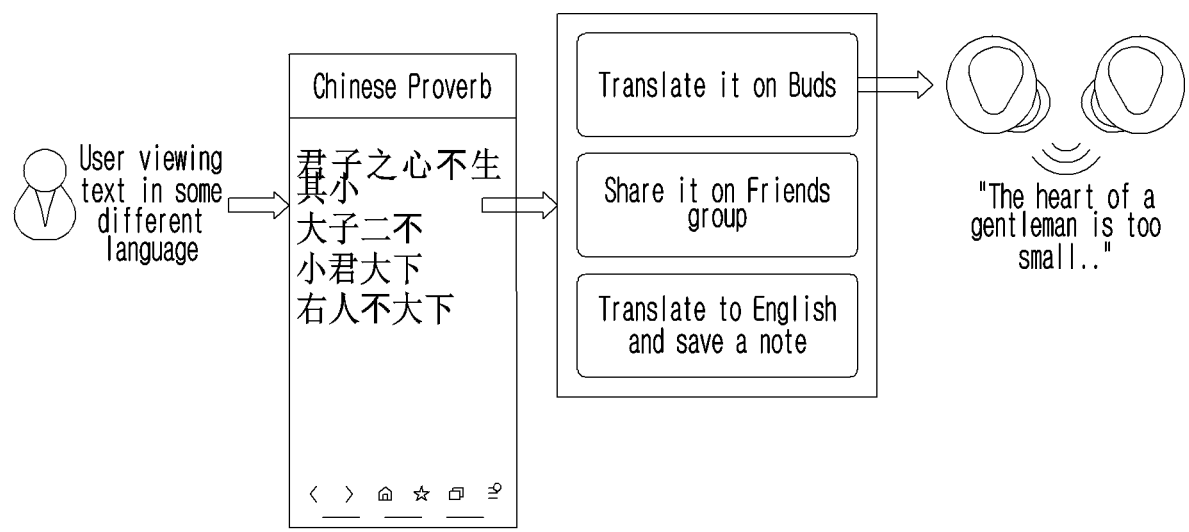

FIGS. 10A, 10B, and 10C are example diagrams depicting a use case scenario of providing the enhanced response to the user, when the user obtains the response in different language, according to various embodiments of the disclosure.

Referring to FIGS. 10A, 10B, and 10C, at operation 10-1, the user obtains the response in different language (e.g., a Chinese proverb), while searching for some text. In such a scenario, at operation 10-2, the electronic device 204 extracts the portion "君子之心不胜其小" from the response by analyzing the response. The electronic device 204 identifies the extracted portion as a translatable phrase and determines the intents such as "Translate text," "Send Message," "Share Text," or the like for the extracted portion.

At operations 10-3a and 10-3b, the electronic device 204 determines the domains and the action devices for the intents determined in relation to the extracted portion. In an example herein, the electronic device 204 determines the domains such as "Translate," "Message," "Share Via," or the like for the intents determined in relation to the extracted portion. In an example herein, the electronic device 204 determines the action devices such as "mobile," "watch," "earphones," "speaker," or the like for the intents determined in relation to the extracted portion.

At operation 10-4, the electronic device 204 ranks the intents associated with each portion of the response. For ranking the intent, the electronic device 204 forms the mappings of the intents for the extracted portion and ranks each mapping based on at least one of the intent and the associated domains and action devices, the user preferences, the usage history, or the like. An example ranking/scores of the mappings of intents for the extracted portion are depicted in FIG. 10A.

Referring to FIG. 10B, at operation 10-5, the electronic device 204 generates the actionable information for the extracted portion and links the generated actionable information with the portion. The electronic device 204 hyperlinks the extracted portion of the response linked with the actionable information.

At operation 10-6, the electronic device 204 provides the hyperlinked portion of the response to the user, which indicate to the user that the hyperlinked portion is the interactable portion. The electronic device 204 allows the user to interact with the hyperlinked portions to provide the linked actionable information. In an example herein, if the user interacts with/selects the portion "君子之心不胜其小" the electronic device 204 provides the actionable information such as "Translate it on Buds," "Share it on Friends group," and "Translate to English and save a note."

In an example herein referring to FIG. 10C, consider that the user selects the actionable information "Translate it on Buds." In such a scenario, the electronic device 204 translates the selected portion of the response by the user and plays the translated portion ("The heart of a gentleman is too small . . . ") on a wearable Bluetooth™ earphone (i.e., an example of the action device/user device (202a-202n).

Figure 11A:
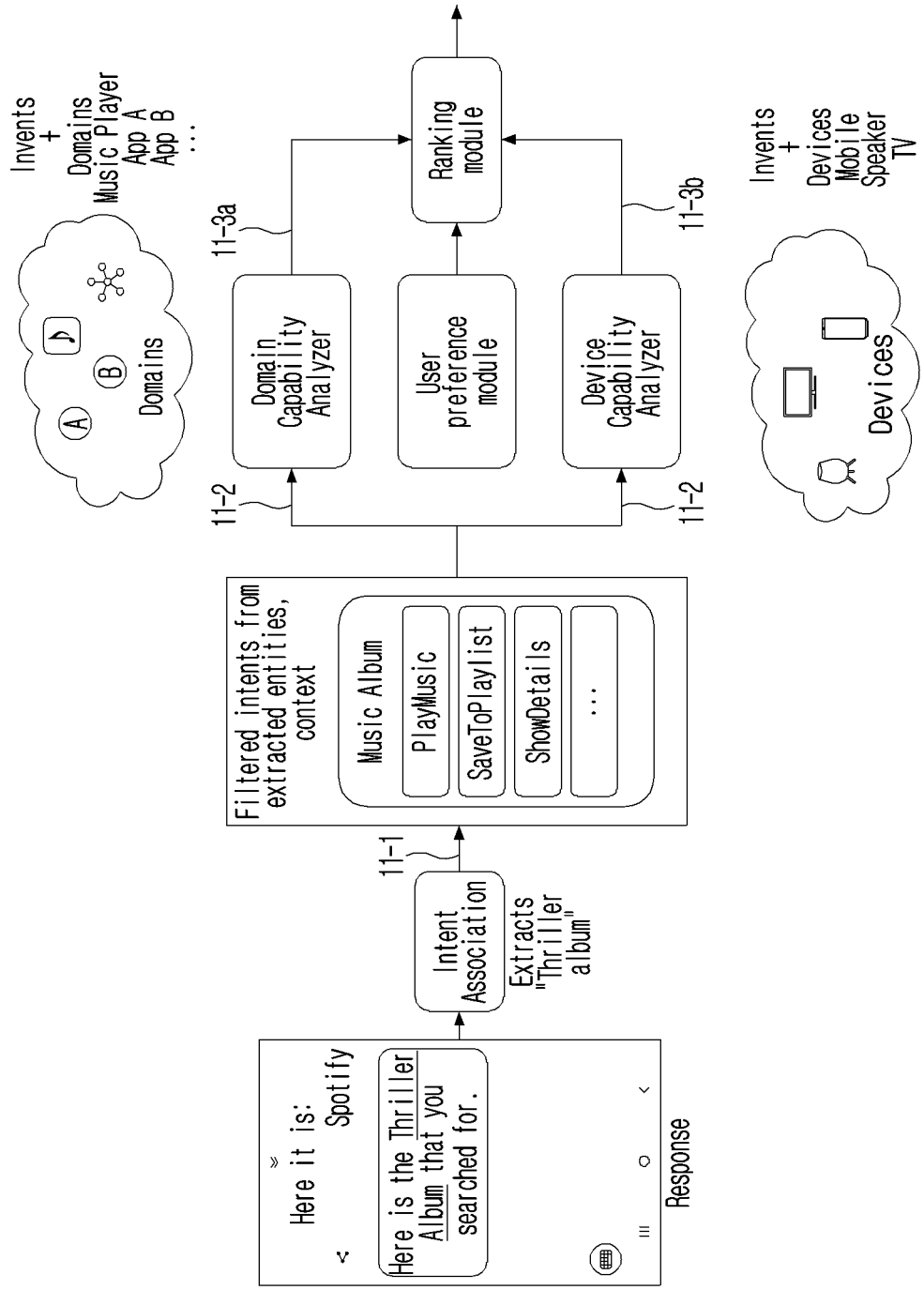
FIGS. 11A, 11B, and 11C are example diagrams depicting a use case scenario of providing an enhanced response to a user, when the user searched for a movie/song, according to various embodiments of the disclosure.
Figure 11B:
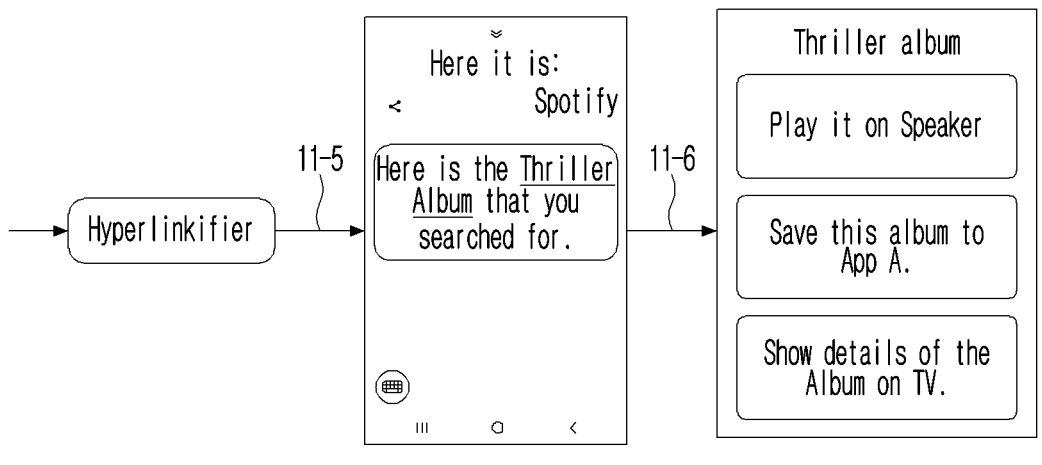
Figure 11C:
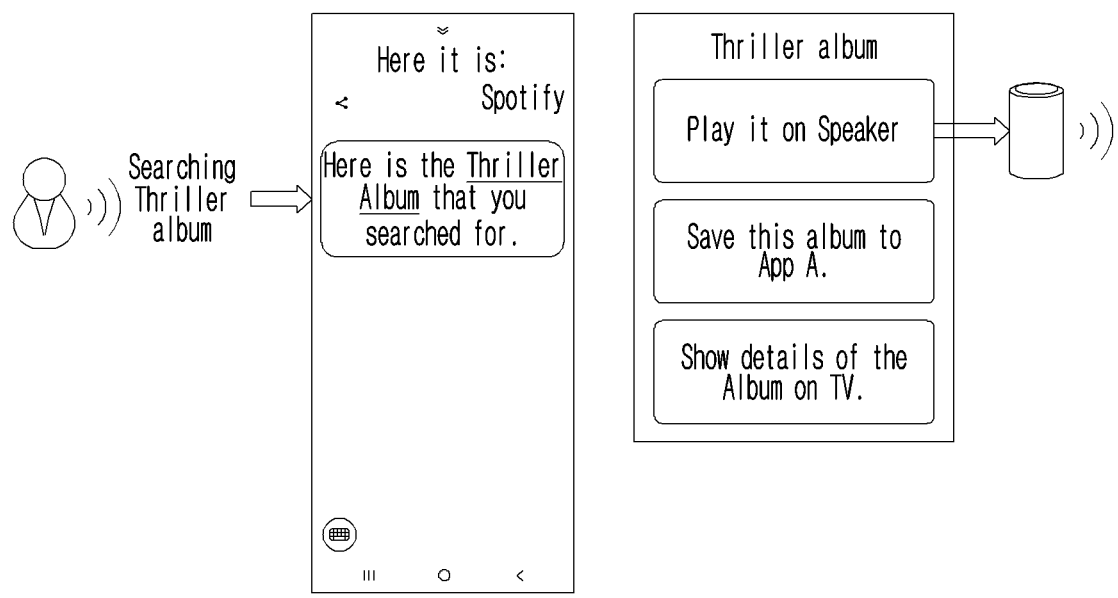

FIGS. 11A, 11B, and 11C are example diagrams depicting a use case scenario of providing the enhanced response to the user, when the user searched for a movie/song, according to various embodiments of the disclosure.

Referring to FIGS. 11A, 11B, and 11C, at operation 11-1, the user searches for a song or a movie through the input virtual interface (e.g., the voice assistant module) and obtains the response "Here is the Thriller album that you searched for." In such a scenario, at operation 11-2, the electronic device 204 extracts the portion "Thriller album" from the response by analyzing the response. The electronic device 204 identifies the portion "Thriller Album" as a music album and determines the intents such as "Play Music," "Save To Playlist," "Show Details," or the like for the portion "Thriller album."

At operations 11-3a and 11-3b, the electronic device 204 determines the domains and the action devices for the intents determined in relation to the portion "Thriller album." In an example herein, the electronic device 204 determines the domains such as "Music Player," "Application (App) A," "App B," or the like for the intents determined in relation to the portion "Thriller album." In an example herein, the electronic device 204 determines the action devices such as "mobile," "speaker," "TV," or the like for the intents determined in relation to the portion "Thriller album."

At operation 11-4, the electronic device 204 ranks the intents associated with the portion "Thriller album" of the response. For ranking the intent, the electronic device 204 forms the mappings of the intents and the associated domains and action devices with respect to the portion "Thriller album" and ranks each mapping based on at least one of the intent and the associated domains and action devices, the user preferences, the usage history, or the like. An example ranking/scores of the tuple of intents for the portion "Thriller album" are depicted in FIG. 11A.

Referring to FIG. 11B, at operation 11-5, the electronic device 204 generates the actionable information for the portion "Thriller album" and links the generated actionable information with the portion "Thriller Album." The electronic device 204 hyperlinks the extracted portion "Thriller Album" of the response linked with the actionable information.

At operation 11-6, the electronic device 204 provides the response with the hyperlinked portion "Thriller Album" to the user, which indicates the user that the hyperlinked portion is the interactable portion. The electronic device 204 allows the user to interact with the hyperlinked portion "Thriller Album" to provide the linked actionable information. In an example herein, if the user interacts with/selects the portion "Thriller Album," the electronic device 204 provides the actionable information such as "Play it on Speaker," "Save this album to App A," and "Show details of the Album on TV."

In an example herein referring to FIG. 11C, consider that the user selects the actionable information "Play it on Speaker." In such a scenario, the electronic device 204 plays the "Thriller album" on a speaker (i.e., playing the action associated with the selected actionable information on the action device/user device 202a-202n).

Figure 12:
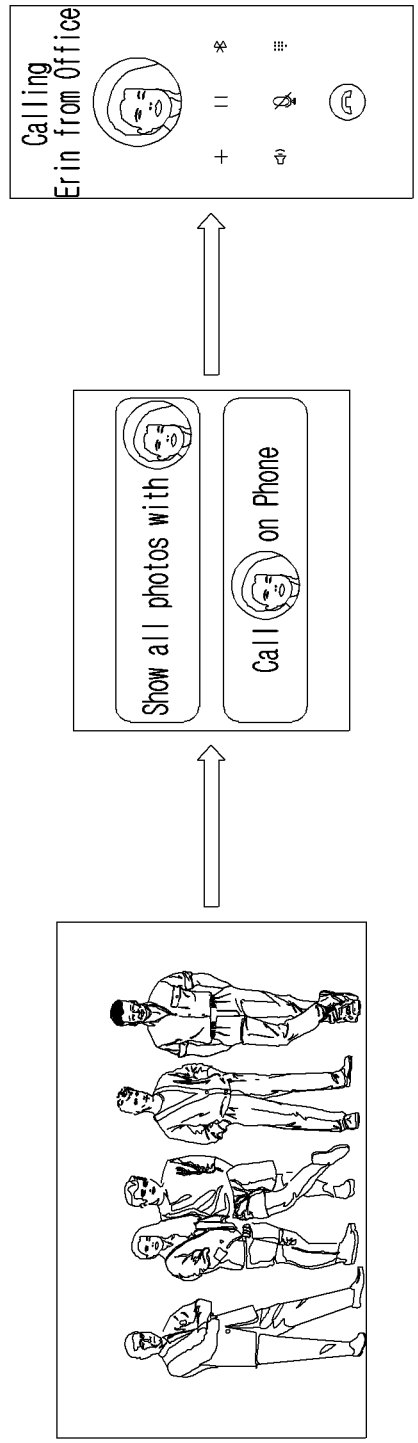
FIG. 12 is an example diagram depicting a use case scenario of automatic response analysis to distinguish portions of a response, according to an embodiment of the disclosure.

FIG. 12 is an example diagram depicting a use case scenario of automatic response analysis to distinguish the portions of the response, according to an embodiment of the disclosure.

Referring to FIG. 12, consider an example scenario, wherein the user is gazing at a person A present in a picture/image while viewing pictures in the gallery application. In such a scenario, the electronic device 204 considers the picture being gazed by the user as the response and provides the actionable information/actions for the person A present in the picture. The electronic device 204 provides the actionable information such as "Show all photos with a person A (present in the gazed picture)," and "Call a person A on phone." In an example herein, consider that the user selects the actionable information "Call a person A on phone." In such a scenario, the electronic device 204 initiates a call to the person A.

Figure 13A:
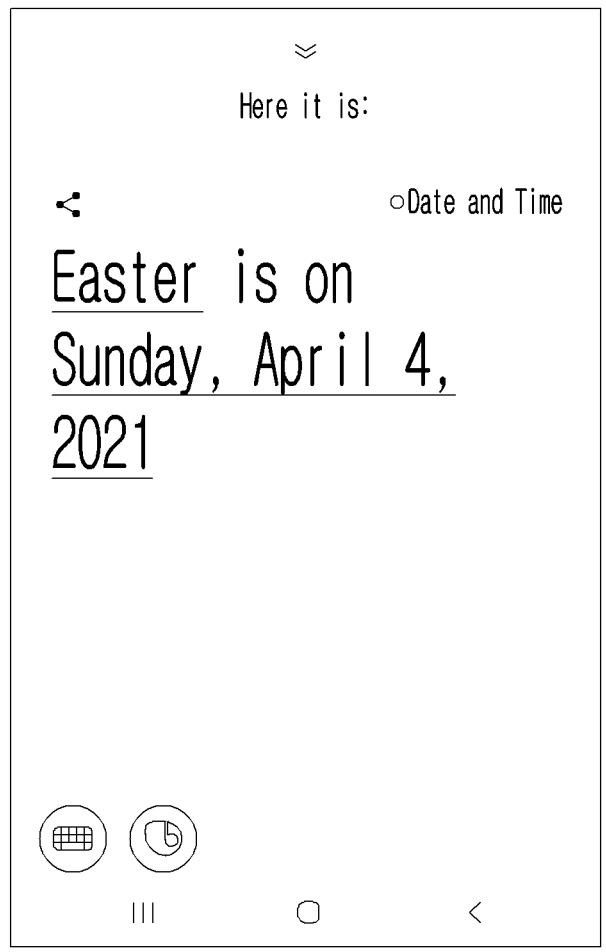
FIGS. 13A, 13B, and 13C are example diagrams depicting dynamically distinguishing of portions of a response, according to various embodiments of the disclosure.
Figure 13B:
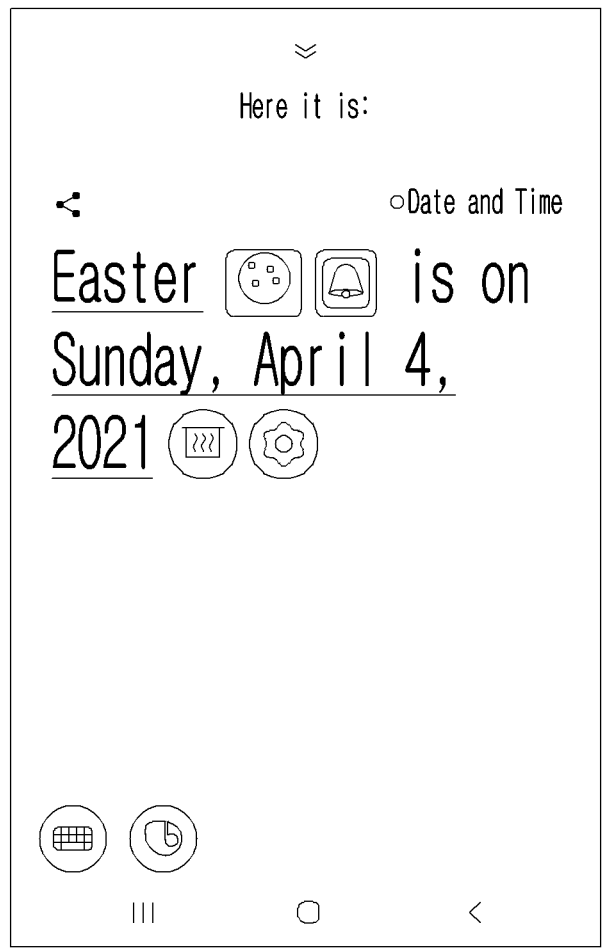
Figure 13C:
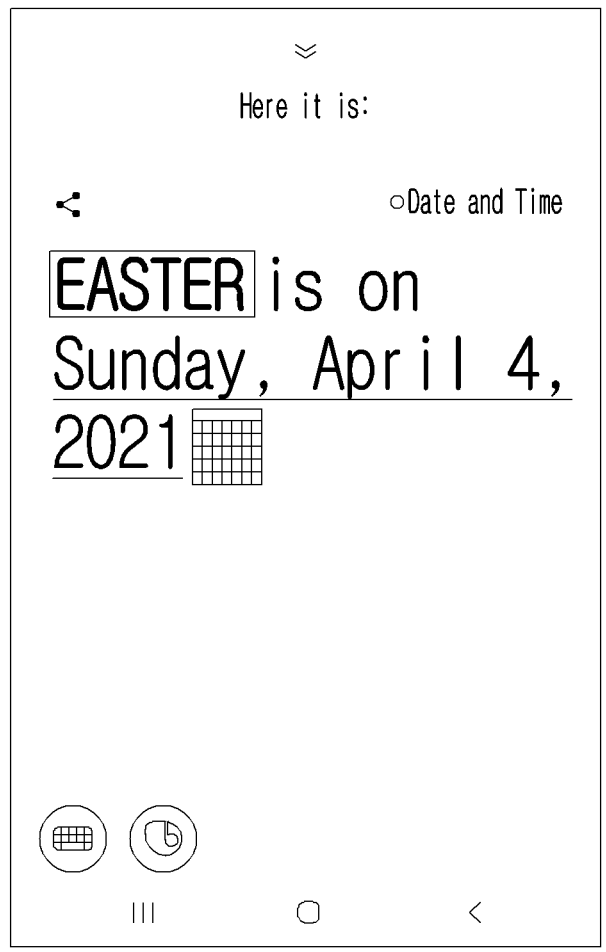

FIGS. 13A, 13B, and 13C are example diagrams depicting dynamically distinguishing of the portions of the response, according to various embodiments of the disclosure.

In an embodiment, the electronic device 204 may distinguish the portions of the response by hyperlinking the portions, referring to FIG. 13A.

In another embodiment, the electronic device 204 may provide the objects for the distinguished/hyperlinked portions of the response, referring to FIG. 13B.

In another embodiment, the electronic device 204 may provide the hyperlinked portions of the response in a different art/style, emotions, or the like, referring to FIG. 13C.

Figure 14A:
FIGS. 14A and 14B are example diagrams depicting use case scenarios of providing different actionable information for a same portion/phrase, according to various embodiments of the disclosure.
Figure 14A:
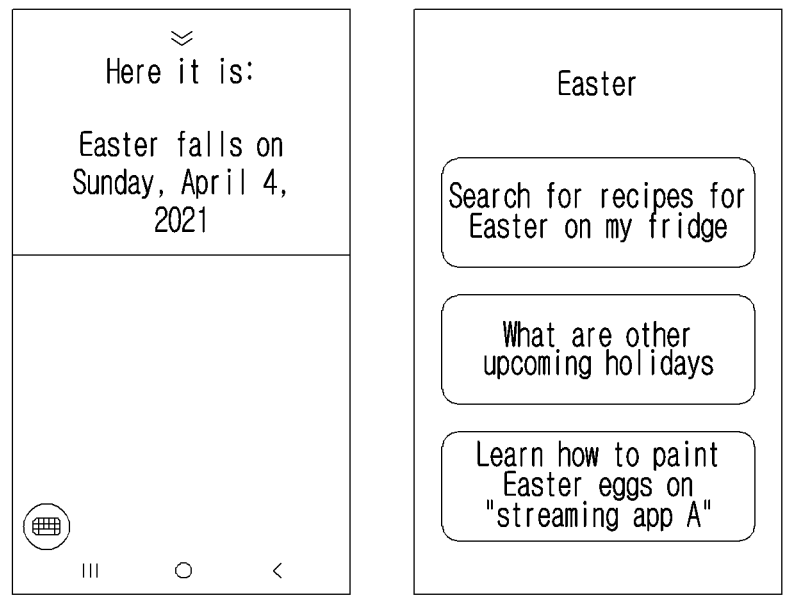
Figure 14B:
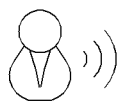
Figure 14B:
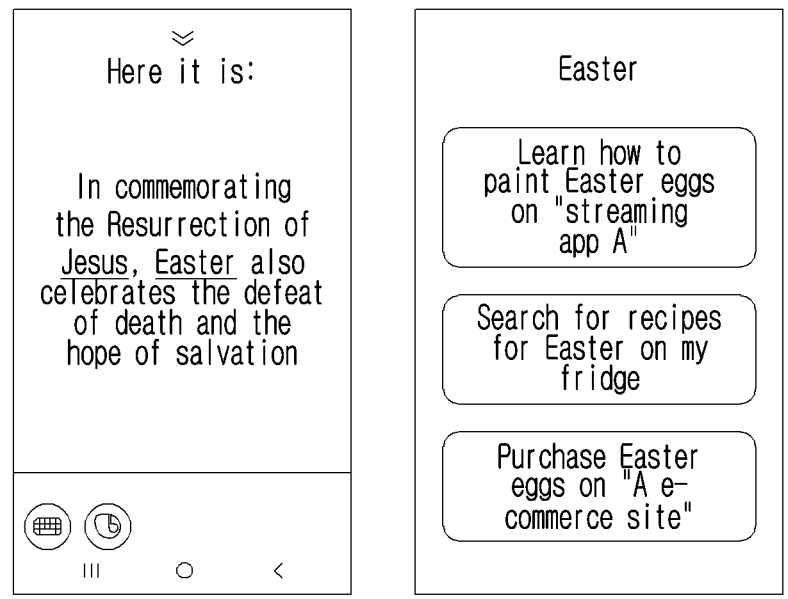

FIGS. 14A and 14B are example diagrams depicting use case scenarios of providing the different actionable information for the same portion/phrase, according to various embodiments of the disclosure.

Embodiments herein allow the electronic device 204 to rank the actionable information/options differently or generate the different actionable information/options for the same portions based on at least one of the query, the information derived from the query, the intents, slots, or the like.

Consider an example scenario, referring to FIG. 14A, wherein the electronic device 204 receives the query "When is Easter?" from the user. In such a scenario, the electronic device 204 provides the enhanced response "Easter falls on Sunday, Apr. 4, 2021." When the user interacts with the portion "Easter," of the response, the electronic device 204 provides the actionable information such as "Search for recipes for Easter on my fridge," "What are other upcoming holidays," and "Learn how to paint Easter eggs on Streaming application A."

Consider an example scenario, referring to FIG. 14B, wherein the electronic device 204 receives the query "Why is Easter celebrated?" from the user. In such a scenario, the electronic device 204 provides the enhanced response "In commemorating the Resurrection of Jesus, Easter also celebrates the defeat of death and the hope of salvation." When the user interacts with the portion "Easter," of the response, the electronic device 204 provides the actionable information such as "Learn how to paint Easter eggs on Streaming application A," "Search for recipes for Easter on my fridge," and "Purchase Easter eggs on "A e-commerce site."

Thus, the different actionable information provided for the same portion.

Figure 15A:
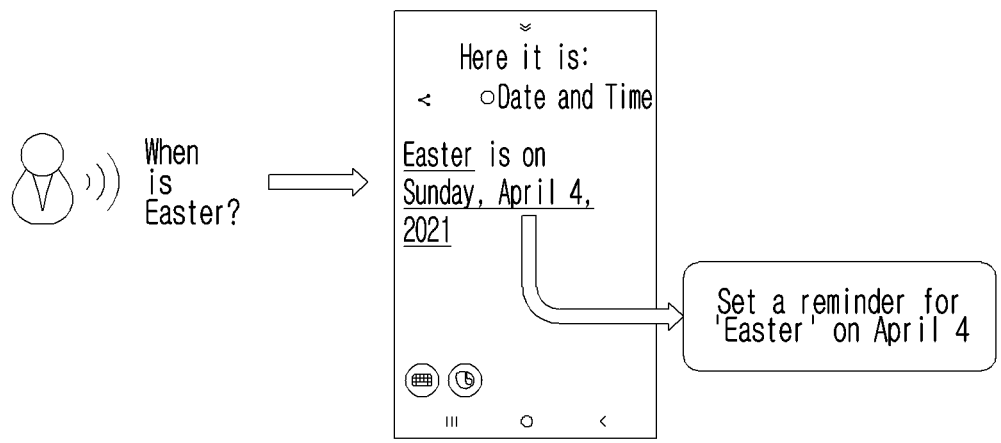
FIGS. 15A and 15B are example diagrams depicting use case scenarios of providing intents as actionable information/options for portions of a response, according to various embodiments of the disclosure.
Figure 15B:
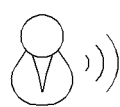

FIGS. 15A and 15B are example diagrams depicting use case scenarios of providing the intents as the actionable information/options for the portions of the response, according to various embodiments of the disclosure.

In an embodiment, the electronic device 204 may provide the intents as the actionable information/options for the portions of the response based on the similarity measurement and quantifying correlation. In an embodiment, the electronic device 204 may provide the combination of the intents as the different kinds of actionable information/options for the portions of the response based on the similarity measurement and quantifying correlation.

Consider an example scenario, referring to FIG. 15A, wherein the electronic device 204 receives the query "When is Easter?" from the user. In such a scenario, the electronic device 204 provides the enhanced response "Easter falls on Sunday, Apr. 4, 2021." When the user interacts with the portion "Sunday, Apr. 4, 2021," of the response, the electronic device 204 provides the actionable information such as "Set a reminder for "Easter" on April 4." The provided actionable information may be the intent associated with the portion "Sunday, Apr. 4, 2021."

Consider an example scenario, as referring to FIG. 15B, wherein the electronic device 204 receives the query "How do I make white sauce?" from the user. In such a scenario, the electronic device 204 provided the enhanced response "In a small saucepan over medium heat, melt butter. Add flour and stir until the butter and flour are well combined.

Pour in milk, stirring constantly as it thickens. Add more milk as required." When the user interacts with the portion "butter," or "flour," or "milk," the electronic device 204 provides the combined intents as the actionable information like "Search for a recipe for making butter from milk."

FIGS. 16A and 16B are example diagrams depicting use case scenarios of providing the actionable information for the portions of the response based on the status and location of user devices associated with a user, according to various embodiments of the disclosure.

Consider an example scenario, referring to FIG. 16A, wherein the electronic device 204 receives the query from the user "What is Queen's most famous song." In such a scenario, the electronic device 204 provides the enhanced response "Queen's most famous song is Bohemian Rhapsody." When the user interacts with the portion "Bohemian Rhapsody," the electronic device 204 provides the actionable information for the portion "Bohemian Rhapsody" based on the location of the user devices 202*a*-202*n* associated with the user.

In an example consider that the user is a room, where a speaker (an example of the user device (e.g., one of the plurality of user devices 202*a*-202*n*)) may be accessible by the user. In such a scenario, the electronic device 204 provides the actionable information such as "Play this on App A on the speaker," and "Look up the Movie Bohemian Rhapsody."

In another example consider that the user is a room wearing ear buds/earphones (an example of the user device (e.g., one of the plurality of user devices 202*a*-202*n*) and the speaker is not accessible by the user. In such a scenario, the electronic device 204 provides the actionable information such as "Play this on my ear buds," and "Look up the movie Bohemian Rhapsody."

Consider an example scenario, referring to FIG. 16B, wherein the electronic device 204 receives the query "Tell me the next step of the recipe" from the user. In such a scenario, the electronic device 204 provides the response "Step 5: Preheat the oven to 180 degrees Celsius," wherein the portions of the response may be distinguished/hyperlinked based on the status of an oven (i.e., an example of the user devices 202*a*-202*n*).

In an example, consider that the status of the oven is detected to be idle. In such a scenario, the electronic device 204 provides the response "Step 5: Preheat the oven to 180 degrees Celsius," wherein the portions "preheat the oven," and "180 degrees Celsius" are hyperlinked. When the user further interacts with the portion "Preheat the oven," the electronic device 204 provides the actionable information such as "Ask SmartThings/IoT device to Preheat oven to 180 degrees Celsius" (i.e., providing the option/actionable information for preheating the oven).

In another example, consider that the status of the oven is detected to be in operation. In such a scenario, the electronic device 204 provides the response "Step 5: Preheat the oven to 180 degrees Celsius," wherein the portion "180 degrees Celsius" may be hyperlinked and the portion "Preheat the oven" may not be hyperlinked, since the status of the oven is detected to be in operation.

FIG. 17 is a flow diagram depicting a method for providing a response to a query, according to an embodiment of the disclosure.

Referring to FIG. 17, at operation 1702, of flow diagram 1700, the method includes receiving, by the electronic device 204, the query. At operation 1704, the method includes generating, by the electronic device 204, the response for the received query.

At operation 1706, the method includes determining, by the electronic device 204, the at least one intent in relation to the at least one portion of the generated response. At operation 1708, the method includes ranking, by the electronic device 204, the determined each of the at least one intent based on at least one of the user preferences and the usage history of at least one user device (e.g., at least one of the plurality of user devices 202*a*-202*n*) present in the IoT environment. At operation 1710, the method includes distinguishing, by the electronic device 204, the at least one portion of the generated response with the determined at least one intent based on the ranking of the at least one intent.

Embodiments Herein

Provide an enhanced response to a query, which suggests a generic set of subsequent actions for the query without being restricted to a current context, which gives more freedom to a user in terms of subsequent interactions;

Apply a collaborative model to rank intents inherently by considering the preferences of all the users in an IoT system (such as devices and domains);

Annotate any screen with intelligent follow up actions by taking into consideration user preferences of devices, intents and domains;

Perform NLU using the context/response data and improves the richness of the response in an organic manner;

Perform an action on multiple secondary/user devices without losing current context or current response, which keeps the user's focus intact and allowing the users to continue their current context/response perusal, but also allows appropriate devices to perform relevant actions;

Suggest upcoming actions regardless of size of content/response analyzed;

Hyperlink/Distinguish portions of the content/response, which gives clarity/cue to the user in the case of a visual/display context. Further, the hyperlinking allows the user to understand exactly what is the context of the action that the hyperlink can carry out, and what was assessed by the device;

Remove the current limiting nature of virtual assistant interactions, where any domain or device may potentially be invoked from the content of the hyperlink alone; and Enhance interaction with, for example, a voice assistant module by allowing the voice assistant module to hyperlink and augment its response automatically instead of manual invocation, thereby providing more follow up utterances to a given utterance.

In an embodiment, providing the enhanced response to the query may have the following advantages:

Increases discovery of services and devices and their capabilities, without excessive burden of knowledge on the user;

Monetization: customizes a ranking system/model to promote select business partners and provide an avenue for revenue;

New scope for query processing: providing the enhanced response to the query may generate a new context for virtual assistant (VA) domains. Further, providing the enhanced response to the query may allow the identified portions of the response to form more context. In addition, domain developers may use features such as Transformative Query to choose between replacing parts of a current response or provide a fresh response; and Some of the actionable information/options may be reused in other portions of the response; Apart from showing a list of options/actionable information on touching the hyperlinked portions, the options/actionable information may be moved to other parts of the screen/medium too.

The embodiments disclosed herein can be implemented through at least one software program running on at least one hardware device and performing network management functions to control the elements. The elements shown in FIGS. 2, 3, 4, 5A, and 5B can be at least one of a hardware device, or a combination of hardware device and software module.

The embodiments disclosed herein describe methods and systems for providing an enhanced response to a query in an IoT environment. Therefore, it is understood that the scope of the protection is extended to such a program and in addition to a computer readable means having a message therein, such computer readable storage means contain program code means for implementation of one or more operations of the method, when the program runs on a server or mobile device or any suitable programmable device. The method is implemented in a preferred embodiment through or together with a software program written in e.g., very high-speed integrated circuit Hardware Description Language (VHDL) another programming language, or implemented by one or more VHDL or several software modules being executed on at least one hardware device. The hardware device may be any kind of portable device that may be programmed. The device may also include means which could be e.g., hardware means like e.g., an application-specific integrated circuit (ASIC), or a combination of hardware and software means, e.g., an ASIC and a field programmable gate array (FPGA), or at least one microprocessor and at least one memory with software modules located therein. The method embodiments described herein could be implemented partly in hardware and partly in software. Alternatively, the disclosure may be implemented on different hardware devices, e.g., using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for providing a response to a query in an Internet of Things (IoT) environment, the method comprising:
receiving, by an electronic device, the query;
generating, by the electronic device, the response for the query;
determining, by the electronic device, at least one intent in relation to each of a plurality of portions of the response;
ranking, by the electronic device, the at least one intent corresponding to each of the plurality of portions based on at least one of user preferences or a usage history of at least one user device present in the IoT environment;
based on the ranking of each of the at least one intent, associate, by the electronic device, each of the ranked at least one intent with the corresponding portion of the plurality of portions;
distinguishing, by the electronic device, the plurality of portions of the response from remaining portions of the response; and
displaying, by the electronic device, the response,
wherein the response is one of a natural language sentence or a natural language combination of sentences, and
wherein the distinguished plurality of portions of the response are displayed differently than the remaining portions of the response.

2. The method of claim 1,
wherein the determining of the at least one intent comprises:
identifying, by the electronic device, the plurality of portions of the response; and
determining, by the electronic device, the at least one intent for each of the plurality of portions of the response based on at least one of information derived from the query, a relationship between the query and the response, contextual inputs, the user preferences, or the usage history of the at least one user device, and
wherein the at least one user device includes the electronic device.

3. The method of claim 2, wherein the contextual inputs include at least one of partial phrases associated with the response, recognizable named entities from the response, a context derived from the response, a current application executing on the electronic device, at least one action being performed by the electronic device at a current instance of time, or the at least one action being performed by the at least one user device at the current instance of time.

4. The method of claim 2, wherein the usage history of the at least one user device includes individual usage history of metric data associated with the at least one user device.

5. The method of claim 2,
wherein the usage history of the at least one user device includes global usage history of metric data associated with the at least one user device, and
wherein the global usage history of the metric data indicates a collection of individual usage history of the metric data maintained for a plurality of users associated with the at least one user device.

6. The method of claim 4, wherein the metric data includes at least one of a location or a status of the at least one user device.

7. The method of claim 1, wherein the ranking of each of the at least one intent comprises:
identifying, by the electronic device, at least one domain and at least one action device for each of the at least one intent, the at least one domain and the at least one action device identified for an intent are configured to execute the intent, the at least one action device belonging to the at least one user device; and
ranking, by the electronic device, each intent by analyzing at least one of the at least one domain and the at least one action device identified for each of the at least one intent or the user preferences using at least one learning method.

8. The method of claim 7, wherein the identifying of the at least one domain and the at least one action device comprises:

analyzing, by the electronic device, at least one of individual user preferences, individual usage history of metric data, or global usage history of the metric data to identify the at least one domain and the at least one action device.

9. The method of claim 7, wherein the at least one learning method includes at least one of at least one machine learning method or at least one non-machine learning method.

10. The method of claim 1, wherein the distinguishing of the plurality of portions of the response comprises:
generating, by the electronic device, actionable information for each of the plurality of portions of the response by analyzing at least one of the ranking of each of the at least one intent, at least one domain, and at least one action device associated with each of the at least one intent, the user preferences, and the usage history of the at least one user device;
linking, by the electronic device, the actionable information with each of the plurality of portions of the response; and
based on the linking of the actionable information with each of the plurality of portions of the response, distinguishing, by the electronic device, the plurality of portions of the response.

11. The method of claim 10, wherein the actionable information includes at least one of a natural language utterance (NLU), sentences in a natural language, or media.

12. The method of claim 10, wherein the distinguishing of the plurality of portions of the response further comprises at least one of hyperlinking the plurality of portions of the response or creating at least one object for each of the plurality of portions of the response.

13. The method of claim 10, further comprising:
categorizing the actionable information based on at least one of at least one action associated with the actionable information or a category of at least one application associated with the at least one action associated with the actionable information.

14. The method of claim 1, further comprising:
generating, by the electronic device, actionable information for each of the plurality of portions of the response based on the corresponding intent from among the at least one intent; and
hyperlinking each of the plurality of portions to the corresponding generated actionable information,
wherein the distinguishing of the plurality of portions of the response further comprises identifying the plurality of portions of the response as including a hyperlink to the corresponding generated actionable information.

15. A method for providing a response to a query in an Internet of Things (IoT) environment, the method comprising:
receiving, by an electronic device, the query;
generating, by the electronic device, a first response to the query, the first response comprising a plurality of portions;
obtaining, by the electronic device, one or more pieces of actionable information from at least one of applications or connected devices related to the plurality of portions of the first response; and
generating, by the electronic device, a second response including the one or more pieces of actionable information in a form of a user selectable interface for selection a portion of the plurality of portions,
wherein the second response is one of a natural language sentence or a natural language combination of sentences.

16. An electronic device in an Internet of Things (IoT) environment, the electronic device comprising:
memory storing one or more computer programs; and
at least one processor communicatively coupled to the memory,
wherein the one or more computer programs include computer-executable instructions which, when executed by the at least one processor, cause the electronic device to:
receive a query,
generate a response for the query,
determine at least one intent in relation to each of a plurality of portions of the response,
rank the at least one intent corresponding to each of the plurality of portions based on at least one of user preferences or a usage history of at least one user device present in the IoT environment,
based on the rank of each of the at least one intent, associate, by the electronic device, each of the ranked at least one intent with the corresponding portion of the plurality of portions,
distinguish the plurality of portions of the response from remaining portions of the response, and
display the response,
wherein the distinguished plurality of portions of the response are displayed differently than the remaining portions of the response, and
wherein the response is one of a natural language sentence or a natural language combination of sentences.

* * * * *